US008885739B2

(12) United States Patent
Noh et al.

(10) Patent No.: US 8,885,739 B2
(45) Date of Patent: Nov. 11, 2014

(54) METHOD AND APPARATUS FOR TRANSMITTING REFERENCE SIGNAL IN WIRELESS COMMUNICATION SYSTEM

(75) Inventors: Min Seok Noh, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 384 days.

(21) Appl. No.: 13/148,295

(22) PCT Filed: Mar. 23, 2010

(86) PCT No.: PCT/KR2010/001767
§ 371 (c)(1),
(2), (4) Date: Aug. 5, 2011

(87) PCT Pub. No.: WO2010/110576
PCT Pub. Date: Sep. 30, 2010

(65) Prior Publication Data
US 2012/0027120 A1 Feb. 2, 2012

Related U.S. Application Data

(60) Provisional application No. 61/162,757, filed on Mar. 24, 2009.

(51) Int. Cl.
*H04L 27/28* (2006.01)
*H04L 1/00* (2006.01)
*H04L 5/00* (2006.01)

(52) U.S. Cl.
CPC ............ *H04L 1/0026* (2013.01); *H04L 1/0027* (2013.01); *H04L 5/0048* (2013.01)
USPC .......................................................... 375/260

(58) Field of Classification Search
CPC ... H04L 5/0007; H04L 5/0048; H04L 5/0053; H04L 5/006; H04L 5/0057; H04L 27/2613
USPC .......... 375/260, 295; 370/436, 208, 329, 330; 455/509, 450
See application file for complete search history.

(56) References Cited

U.S. PATENT DOCUMENTS

| | | | |
|---|---|---|---|
| 2006/0067417 A1 | 3/2006 | Park et al. | |
| 2007/0099584 A1 | 5/2007 | Niu et al. | |
| 2007/0248113 A1* | 10/2007 | Ko et al. | 370/436 |
| 2008/0175330 A1 | 7/2008 | Jeon et al. | |
| 2009/0245193 A1* | 10/2009 | Gaal et al. | 370/329 |
| 2010/0104034 A1* | 4/2010 | Nam et al. | 375/260 |

(Continued)

OTHER PUBLICATIONS

R1-090619, DL RS Designs for Higher Order MIMO, 3GPP TSG RAN WG1 #56, Samsung, Athens, Greece, Feb. 9-13, 2009.*
R1-090621, Impact of DL CQI RS Insertion on Rel-8 PDSCH Performance, Samsung, 3GPP TSG RAN WG1#56, Athens, Greece, Feb. 9-13, 2009.*

(Continued)

*Primary Examiner* — Aristocratis Fotakis
(74) *Attorney, Agent, or Firm* — Lee, Hong, Degerman, Kang & Waimey

(57) ABSTRACT

A method and apparatus for transmitting a reference signal in a wireless communication system is provided. CSI-RSs are generated for each of a plurality of antennas. The CSI-RS are mapped to a resource region on a basis of a CSI-RS pattern according to the number of the plurality of antennas. The CSI-RS are transmitted to a user equipment (UE).

6 Claims, 21 Drawing Sheets

(a)

(b)

(56) References Cited

U.S. PATENT DOCUMENTS

2010/0118989 A1* 5/2010 Sayana et al. ............ 375/260
2010/0135242 A1* 6/2010 Nam et al. ............... 370/330
2010/0195748 A1* 8/2010 Nam et al. ............... 375/260
2011/0237270 A1* 9/2011 Noh et al. ............... 455/450

OTHER PUBLICATIONS

R1-090632, Discussion of CQI-RS design for LTE-A CoMP, ZTE, 3GPP TSG-RAN Working Group 1 Meeting #56, Athens, Greece, Feb. 9-13, 2009.*

* cited by examiner (a)

(b)

METHOD AND APPARATUS FOR TRANSMITTING REFERENCE SIGNAL IN WIRELESS COMMUNICATION SYSTEM

CROSS-REFERENCE TO RELATED APPLICATIONS

This application is the National Stage filing under 35 U.S.C. 371 U.S. national stage of International Application No. PCT/KR2010/001767, filed on Mar. 23, 2010, which claims the benefit of U.S. Provisional Application Ser. No. 61/162,757, filed on Mar. 24, 2009, the contents of which are incorporated by reference herein in their entirety.

TECHNICAL FIELD

The present invention relates to wireless communications, and more particularly, to a method and apparatus for transmitting a reference signal in a wireless communication system.

BACKGROUND ART

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, Inter-Symbol Interference (ISI), and the Doppler Effect resulting from the mobility of a user equipment. A variety of techniques are being developed in order to overcome the abnormal characteristics of the wireless channel and to increase the reliability of wireless communication.

Technology for supporting reliable and high-speed data service includes Orthogonal Frequency Division Multiplexing (OFDM), Multiple Input Multiple Output (MIMO), and so on.

An OFDM system is being considered after the $3^{rd}$ generation system which is able to attenuate the ISI effect with low complexity. The OFDM system converts symbols, received in series, into N (N is a natural number) parallel symbols and transmits them on respective separated N subcarriers. The subcarriers maintain orthogonality in the frequency domain. It is expected that the market for mobile communication will shift from the existing Code Division Multiple Access (CDMA) system to an OFDM-based system.

MIMO technology can be used to improve the efficiency of data transmission and reception using multiple transmission antennas and multiple reception antennas. MIMO technology includes spatial multiplexing, transmit diversity, beam-forming and the like. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a Reference Signal (RS) which is known to both a transmitter and a receiver can be used.

A subcarrier used to transmit the reference signal is referred to as a reference signal subcarrier, and a resource element used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value $\hat{h}$ using Equation 1 in the case in which a Least Square (LS) method is used.

$$\hat{h}=y/p=h+n/p=h+\hat{n} \qquad [\text{Math. 1}]$$

The accuracy of the channel estimation value $\hat{h}$ estimated using the reference signal p is determined by the value $\hat{n}$. To accurately estimate the value h, the value $\hat{n}$ must converge on 0. To this end, the influence of the value $\hat{n}$ has to be minimized by estimating a channel using a large number of reference signals. A variety of algorithms for a better channel estimation performance may exist.

An LTE-A system can support a maximum of 8 transmission antennas. An additional extended antenna not a legacy antenna is required, and a reference signal of the extended antenna needs to be newly designed and mapped to a resource region.

SUMMARY OF INVENTION

Technical Problem

The present invention provides a method and apparatus for transmitting a reference signal in a wireless communication system.

Solution to Problem

In an aspect, a transmitter for transmitting a reference signal in a wireless communication system is provided. The transmitter include a Channel State Information (CSI) reference signal (CSI-RS) generator configured to generate CSI-RSs for each of a plurality of antennas, a CSI-RS mapper for mapping the CSI-RSs to a resource region on a basis of a CSI-RS pattern according to the number of the plurality of antennas, and a transmit circuitry for transmitting a radio signal and the CSI-RSs. The number of the plurality of antennas may be one of 4, 6, and 8. The resource region may be assigned to a subframe. The subframe may include 7 Orthogonal Frequency Division Multiplexing (OFDM) symbols if the subframe has a normal Cyclic Prefix (CP), and the resource region may be at least one of a sixth OFDM symbol, a ninth OFDM symbol, an eleventh OFDM symbol, and a last OFDM symbol of the subframe. The subframe may include 6 OFDM symbols if the subframe has an extended CP, and the resource region may be at least one of a sixth OFDM symbol, a ninth OFDM symbol, and a last OFDM symbol of the subframe. The resource region may be assigned to the subframe at a fixed cycle. The CSI-RSs for the respective antennas may be mapped to the resource region at a regular interval of subcarriers. The interval of the subcarriers may be one of 3 subcarriers, 6 subcarriers, 7 subcarriers, 8 subcarriers, 9 subcarriers, and 12 subcarriers. The CSI-RS generator may further generate an additional CSI-RS for tracking a time-varying channel for each of the antennas.

In another aspect, a receiver for processing a reference signal in a wireless communication system is provided. The receiver include a receive circuitry for receiving a radio signal and Channel State Information (CSI) reference signals (CSI-RS), a CSI estimator for estimating a channel state on a basis of the CSI-RSs, and a processor for processing the radio signal using the estimated channel state, wherein the CSI-RSs are mapped to a resource region on a basis of a CSI-RS pattern according to the number of the plurality of antennas and transmitted. The number of the plurality of antennas may be one of 4, 6, and 8.

In another aspect, a method of transmitting a reference signal in a wireless communication system is provided. The method include generating Channel State Information (CSI) reference signals (CSI-RS) for each of a plurality of antennas, mapping the CSI-RSs to a resource region on a basis of a CSI-RS pattern according to the number of the plurality of antennas, and transmitting the CSI-RSs. The number of antennas may be one of 4, 6, and 8. The resource region may be assigned to a subframe. The subframe may include 7 OFDM symbols if the subframe has a normal CP, and the resource region may be at least one of a sixth OFDM symbol, a ninth OFDM symbol, an eleventh OFDM symbol, and a last OFDM symbol of the subframe. The subframe may include 6 OFDM symbols if the subframe has an extended CP, and the resource region may be at least one of a sixth OFDM symbol, a ninth OFDM symbol, and a last OFDM symbol of the subframe.

Advantageous Effects of Invention

In accordance with the present invention, the reference signal of an extended antenna is mapped to a resource region with the reference signal of a legacy antenna taken into consideration and then transmitted. Accordingly, a channel state can be estimated more accurately.

MODE FOR THE INVENTION

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

LTE/LTE-A is chiefly described as an example in order to clarify the description, but the technical spirit of the present invention is not limited to LTE/LTE-A.

Figure 1:
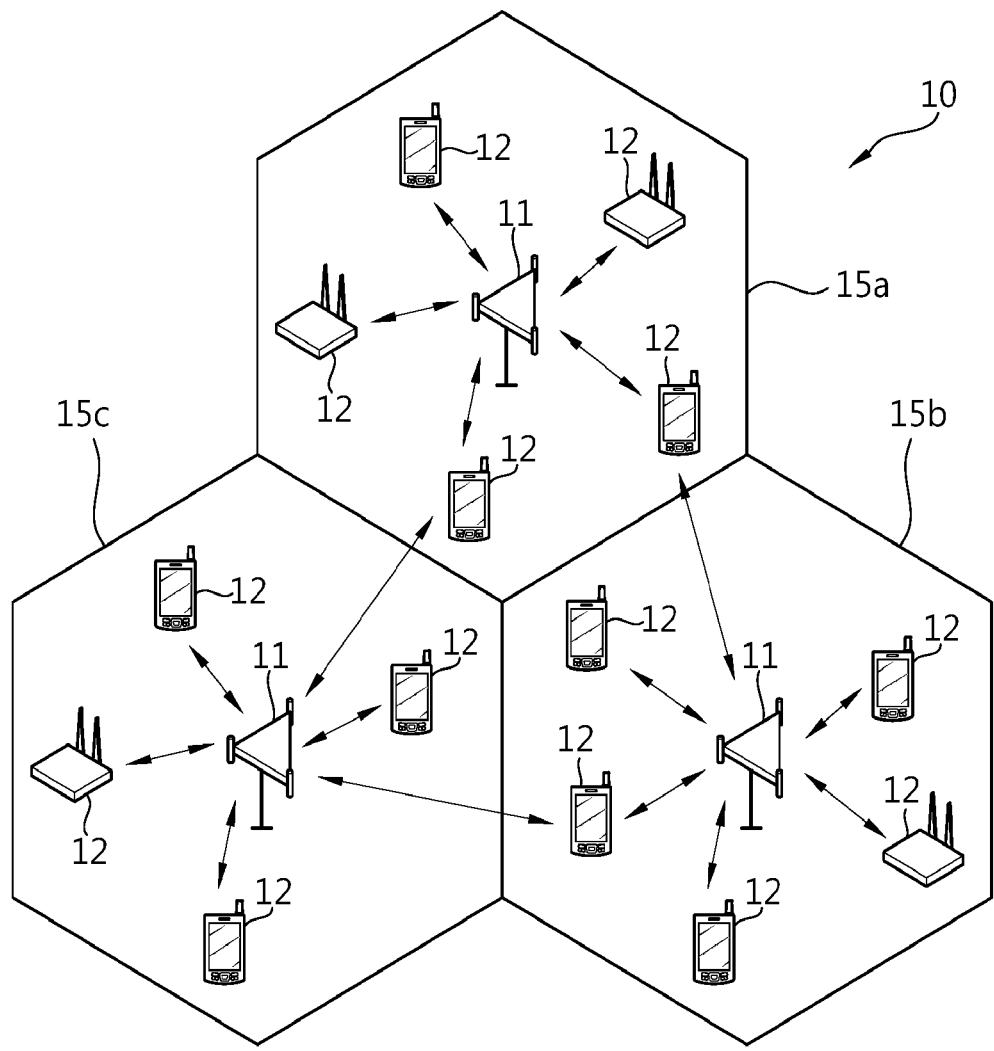
FIG. 1 shows a wireless communication system.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
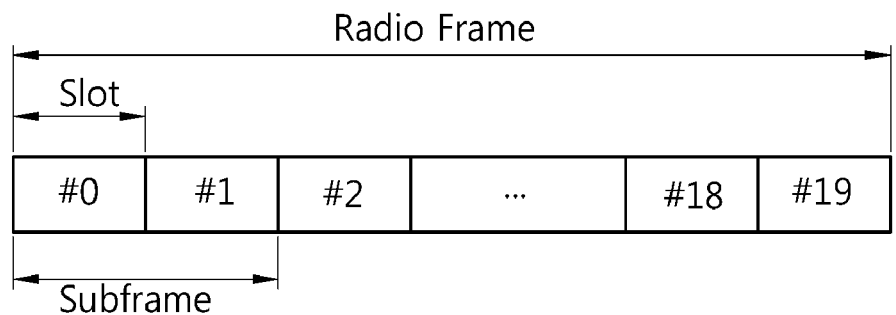
FIG. 2 shows the structure of a radio frame in the 3GPP LTE specifications.

FIG. 2 shows the structure of a radio frame in the 3GPP LTE specifications. For the radio frame structure, reference can be made to Paragraph 5 of 3GPP (3$^{rd}$ Generation Partnership Project) TS 36.211 V8.2.0 (2008 March) "Technical Specification Group Radio Access Network; Evolved Universal Terrestrial Radio Access (E-UTRA); Physical channels and modulation (Release 8)".

Referring to FIG. 2, the radio frame includes ten sub-frames, and one sub-frame includes two slots. The slots within the radio frame are allocated slot numbers from #0 to #19. The time that it takes to transmit one sub-frame is called a Transmission Time Interval (TTI). The TTI can be called a scheduling unit for data transmission. For example, the length of one radio frame can be 10 ms, the length of one sub-frame can be 1 ms, and the length of one slot may be 0.5 ms.

One slot includes a plurality of Orthogonal Frequency Division Multiplexing (OFDM) symbols in the time domain and a plurality of subcarriers in the frequency domain. The OFDM symbol is used to represent one symbol period because the 3GPP LTE specifications use OFDMA in the downlink. The OFDM symbol can be called another terminology according to the multi-access method. For example, in the case in which SC-FDMA is used as an uplink multi-access method, corresponding symbols can be called SC-FDMA symbols. A Resource Block (RB) is the unit of resource allocation, and it includes a plurality of consecutive subcarriers in one slot. The structure of a radio frame is only an example. The number of sub-frames included in a radio frame, the number of slots included in a sub-frame, or the number of OFDM symbols included in a slot can be changed in various ways.

In the 3GPP LTE specifications, one slot is defined to include seven OFDM symbols in a normal Cyclic Prefix (CP), and one slot is defined to include six OFDM symbols in the extended CP.

Figure 3:
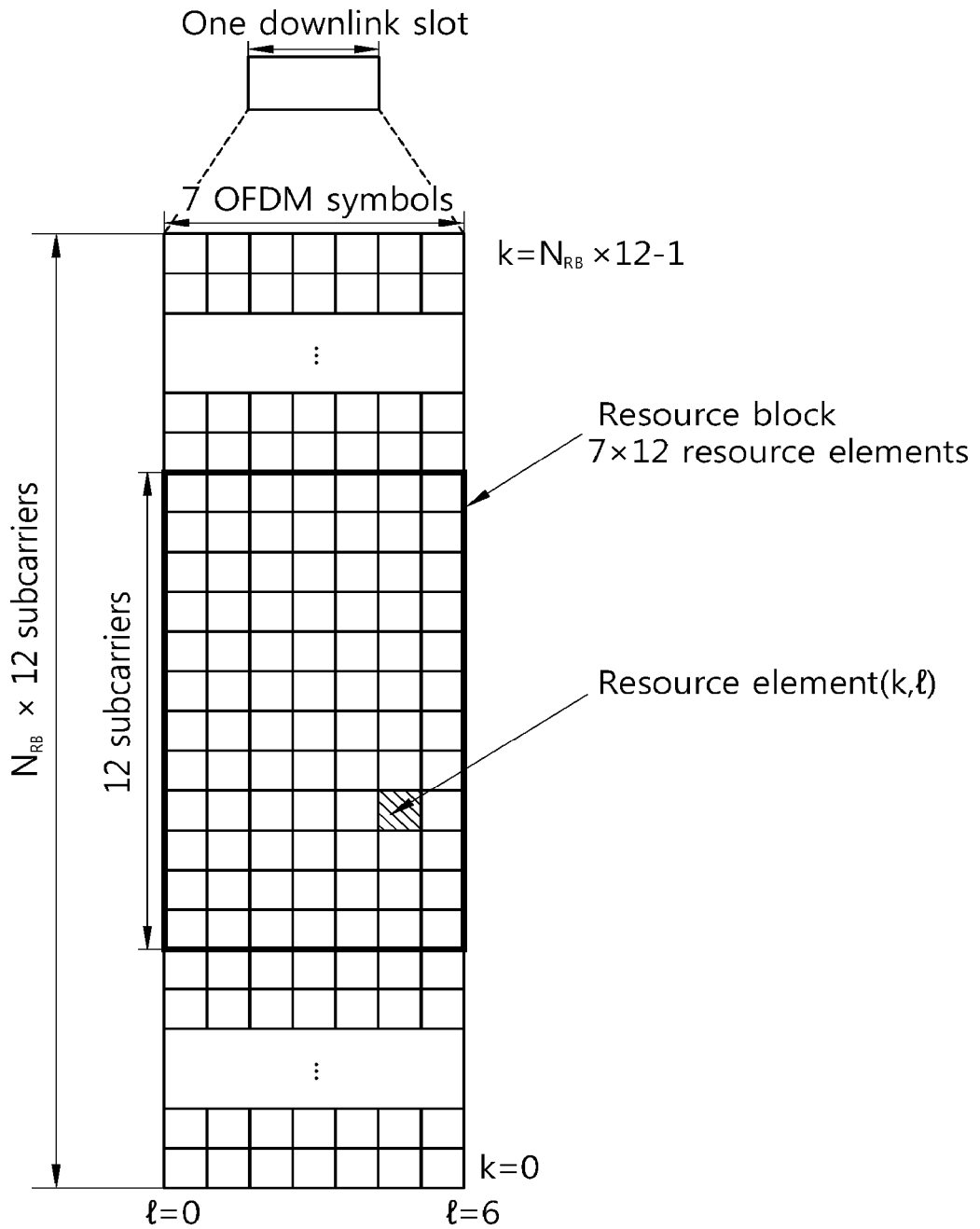
FIG. 3 shows an example of a resource grid for one downlink slot.

FIG. 3 shows an example of a resource grid for one downlink slot.

The downlink slot includes a plurality of OFDM symbols in the time domain and $N_{RB}$ resource blocks in the frequency domain. The number of resource blocks $N_{RB}$ included in a downlink slot is dependent on a downlink transmission bandwidth set in a cell. For example, in the LTE system, the number of resource blocks $N_{RB}$ may be one of 60 to 110. One resource block includes a plurality of subcarriers in the frequency domain. The structure of an uplink slot can be identical with that of the downlink slot.

Each of elements on the resource grid is called a resource element. The resource element on the resource grid can be identified by an index pair (k, l) within a slot. Here, k(k= 0, ..., $N_{RB}$×12−1) denotes a subcarrier index in the frequency domain, and l (l=0, ..., 6) denotes an OFDM symbol index in the time domain.

In this case, one resource block is illustrated to include 7×12 resource elements, including 7 OFDM symbols in the time domain and 12 subcarriers in the frequency domain. However, the number of OFDM symbols and the number of subcarriers within a resource block are not limited to the 7×12 resource elements. The number of OFDM symbols and the number of subcarriers can be variously changed depending on the length of a CP, frequency spacing, and so on. For example, in the normal CP, the number of OFDM symbols can be 7, and in the extended CP, the number of OFDM symbols can be 6. In one OFDM symbol, the number of subcarriers can be one of 128, 256, 512, 1024, 1536, and 2048.

Figure 4:
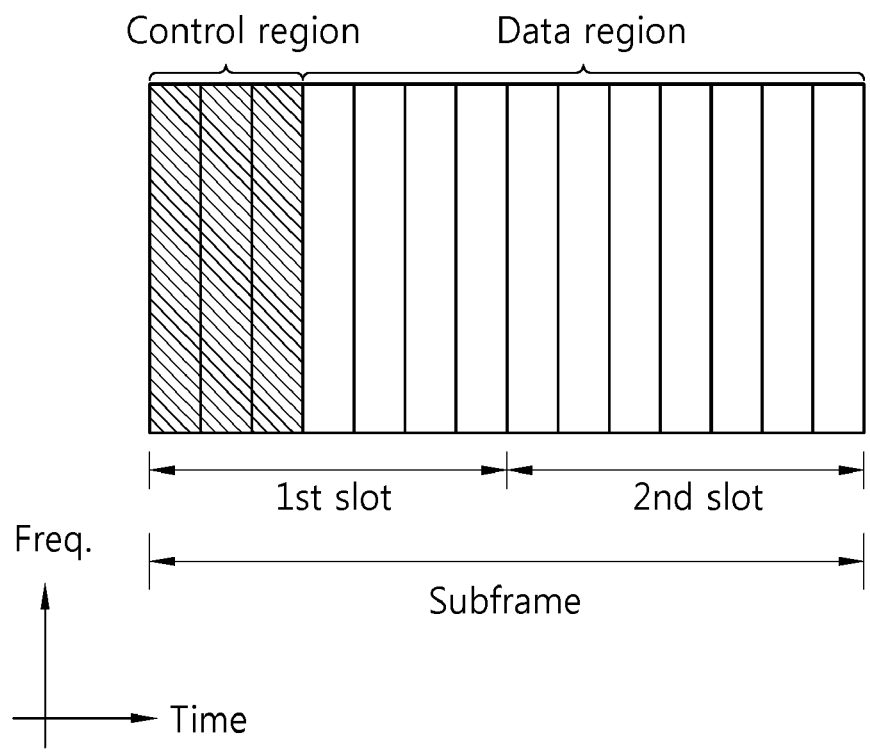
FIG. 4 shows the structure of a downlink sub-frame.

FIG. 4 shows the structure of a downlink sub-frame.

The downlink sub-frame includes two slots in the time domain. Each of the slots includes 7 OFDM symbols in the normal CP. A maximum of three OFDM symbols of the first slot within the sub-frame correspond to a control region to which control channels are allocated, and the remaining OFDM symbols correspond to a data region to which Physical Downlink Shared Channels (PDSCHs) are allocated. Downlink control channels used in the 3GPP LTE include a Physical Control Format Indicator Channel (PCFICH), a Physical Downlink Control Channel (PDCCH), a Physical Hybrid-ARQ Indicator Channel (PHICH), and so on. The PCFICH transmitted in the first OFDM symbol of a sub-frame carries information about the number of OFDM symbols (that is, the size of a control region) which is used to transmit control channels within the sub-frame. The PHICH carries an Acknowledgement (ACK)/Not-Acknowledgement (NACK) signal for an uplink Hybrid Automatic Repeat Request (HARM). In other words, an ACK/NACK signal for uplink data transmitted by a user equipment is transmitted on the PHICH. Control information transmitted through the PDCCH is called Downlink Control Information (DCI). The DCI indicates uplink or downlink scheduling information, an uplink transmission power control command for specific user equipment groups, etc.

Figure 5:
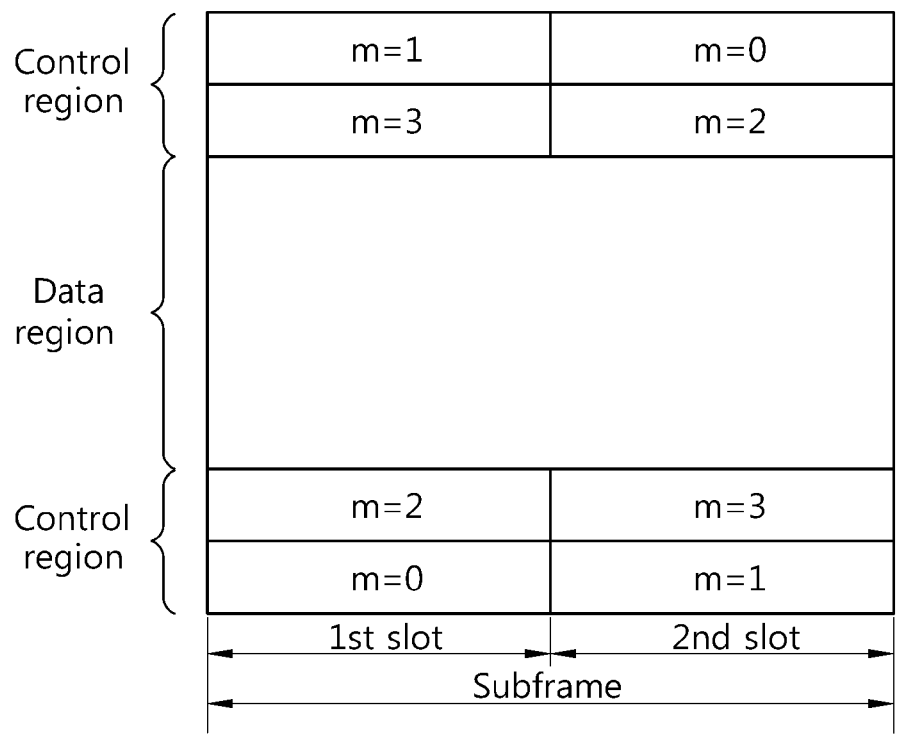
FIG. 5 shows the structure of an uplink sub-frame.
Figure 5:
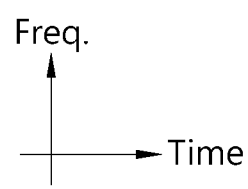

FIG. 5 shows the structure of an uplink sub-frame.

The uplink sub-frame can be divided into a control region and a data region in the frequency domain. The control region is allocated with a Physical Uplink Control Channel (PUCCH) on which uplink control information is transmitted. The data region is allocated with a Physical Uplink Shared Channel (PUSCH) on which data are transmitted. To maintain the characteristic of a single carrier, a user equipment does not transmit the PUCCH and the PUSCH at the same time. The PUCCHs of one user equipment forms a RB pair within a sub-frame and are then allocated. The RBs included in the RB pair occupy different subcarriers of respective slots. It is said that a RB pair allocated to a PUCCH is frequency-hopped at the slot boundary.

The reference signals, in general, are transmitted in a sequence. A specific sequence can be used as the reference signal sequence without special restrictions. A Phase Shift Keying (PSK)-based computer-generated sequence can be used as the reference signal sequence. PSK can include, for example, Binary Phase Shift Keying (BPSK), Quadrature Phase Shift Keying (QPSK), etc. Alternatively, a Constant Amplitude Zero Auto-Correlation (CAZAC) sequence can be used as the reference signal sequence. The CAZAC sequence can include, for example, a Zadoff-Chu (ZC)-based sequence, a ZC sequence with cyclic extension, and a ZC sequence with truncation. Alternatively, a Pseudo-random (PN) sequence can be used as the reference signal sequence. The PN sequence can include, for example, m-sequence, a computer-generated sequence, a Gold sequence, and a Kasami sequence. Further, a cyclically shifted sequence can be used as the reference signal sequence.

A reference signal can be classified into a cell-specific reference signal (CRS), an MBSFN reference signal, and a user equipment-specific reference signal (UE-specific RS). The CRS is transmitted to all the UEs within a cell and used for channel estimation. The MBSFN reference signal can be transmitted in sub-frames allocated for MBSFN transmission. The UE-specific reference signal is received by a specific UE or a specific UE group within a cell. The UE-specific reference signal is chiefly used by a specific UE or a specific UE group for the purpose of data demodulation.

Figure 6:
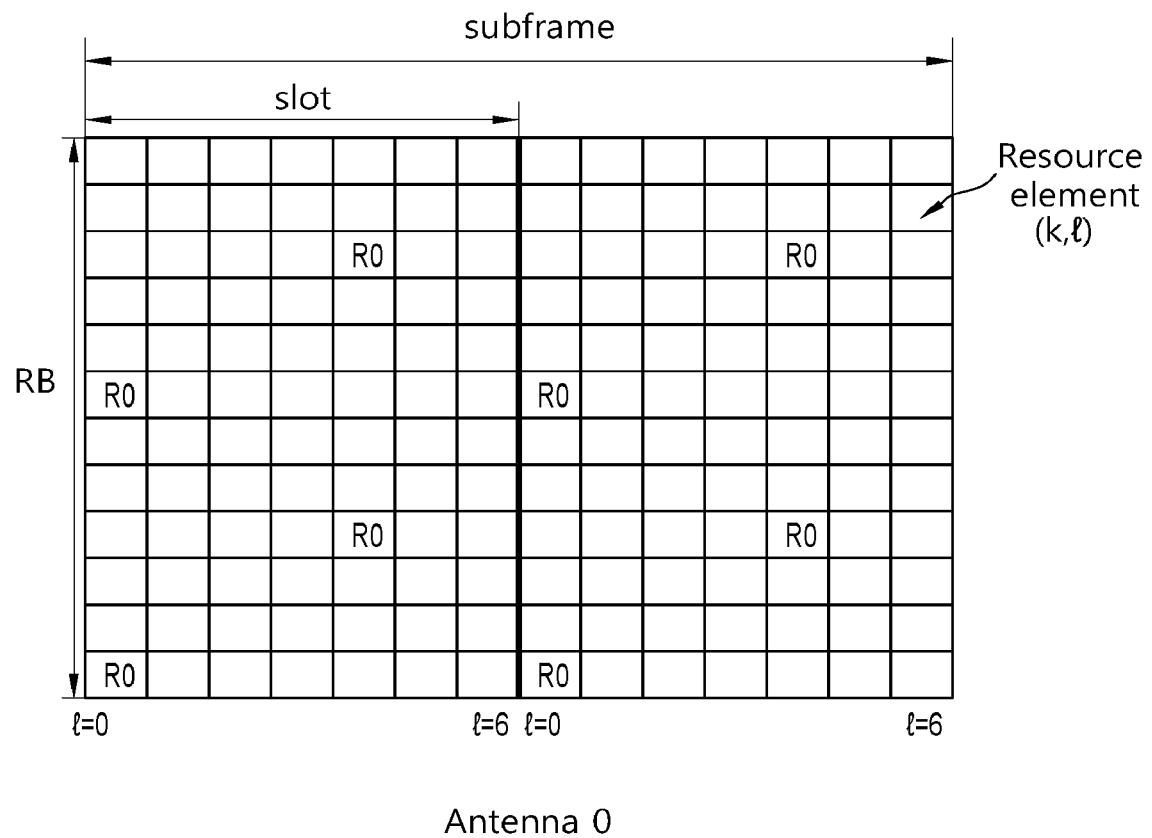
FIG. 6 shows an exemplary CRS structure when a BS uses one antenna.
Figure 7:
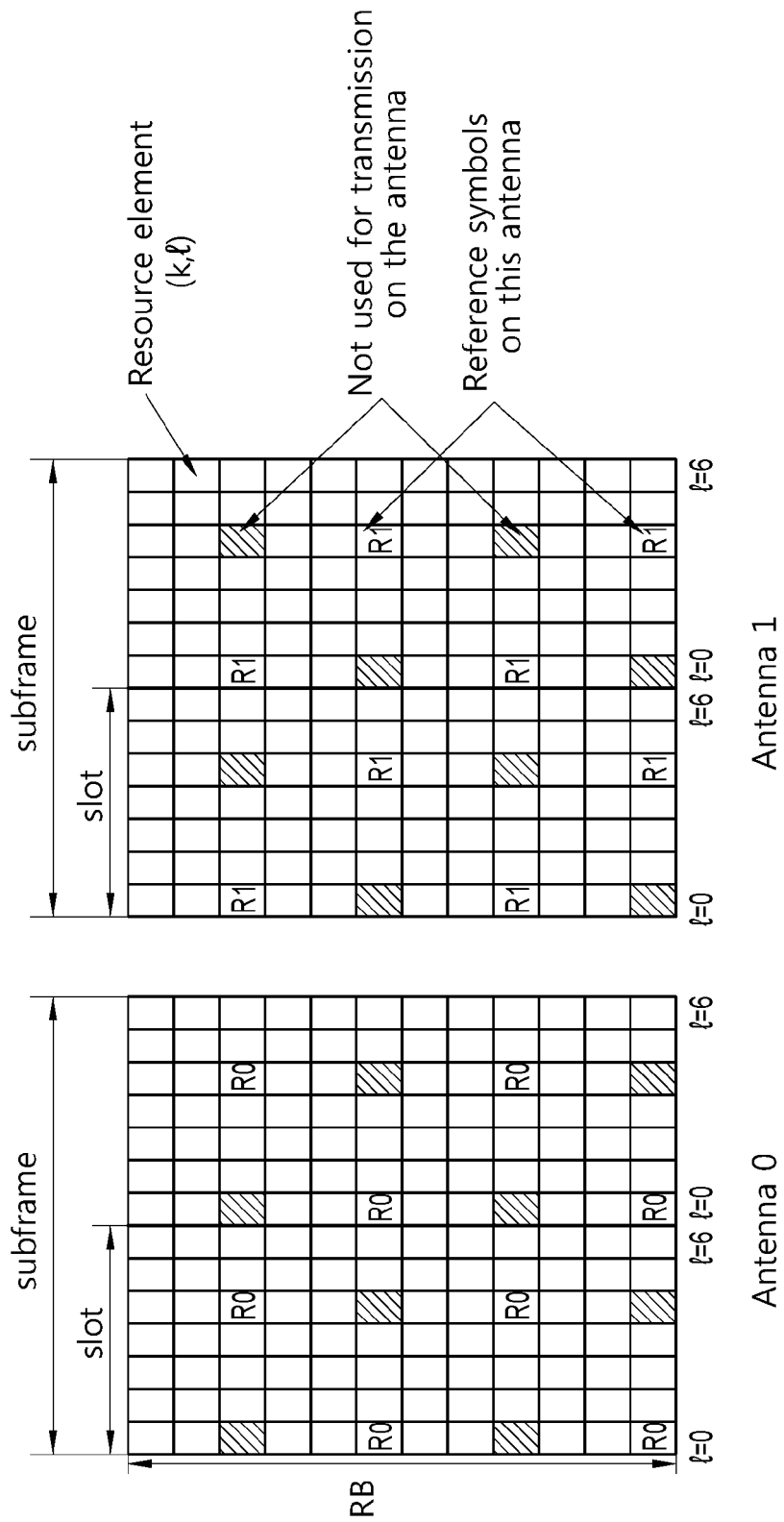
FIG. 7 shows an exemplary CRS structure when a BS uses two antennas.
Figure 8:
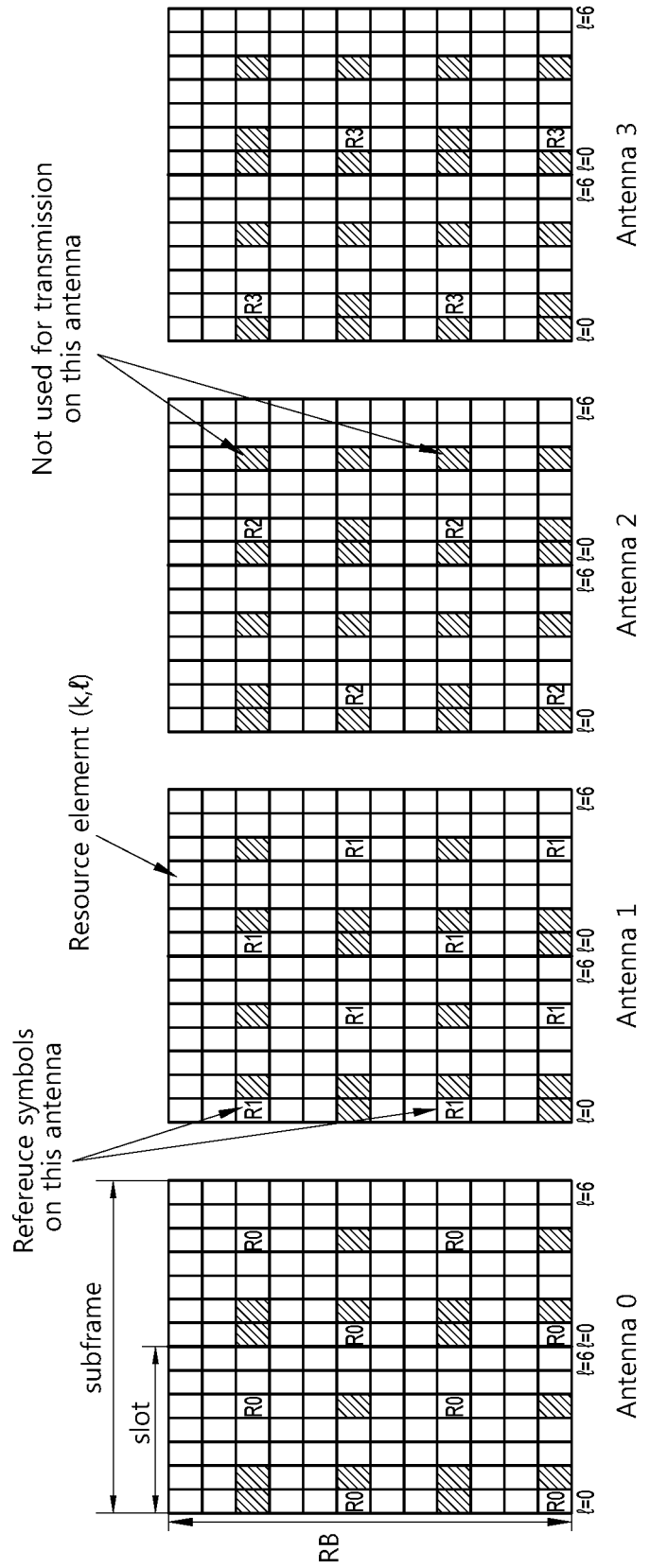
FIG. 8 shows an exemplary CRS structure when a BS uses four antennas.

FIG. 6 shows an exemplary CRS structure when a BS uses one antenna. FIG. 7 shows an exemplary CRS structure when a BS uses two antennas. FIG. 8 shows an exemplary CRS structure when a BS uses four antennas. The section 6.10.1 of 3GPP TS 36.211 V8.2.0 (2008 March) may be incorporated herein by reference. In addition, the exemplary CRS structure may be used to support a feature of an LTE-A system. Examples of the feature of the LTE-A system include coordinated multi-point (CoMP) transmission and reception, spatial multiplexing, etc.

Referring to FIG. 6 to FIG. 8, in multi-antenna transmission, a BS uses a plurality of antennas, each of which has one resource grid. 'R0' denotes an RS for a first antenna, 'R1' denotes an RS for a second antenna, 'R2' denotes an RS for a third antenna, and 'R3' denotes an RS for a fourth antenna. R0 to R3 are located in a subframe without overlapping with one another. l indicates a position of an OFDM symbol in a slot. In case of a normal cyclic prefix (CP), l has a value in the range of 0 to 6. In one OFDM symbol, RSs for the respective antennas are located with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The CRS is always transmitted by the number of antennas irrespective of the number of streams. The CRS has an independent RS for each antenna. A frequency-domain position and a time-domain position of the CRS in a subframe are determined irrespective of a UE. A CRS sequence to be multiplied to the CRS is generated also irrespective of the UE. Therefore, all UEs in a cell can receive the CRS. However, a position of the CRS in the subframe and the CRS sequence may be determined according to a cell identifier (ID). The time-domain position of the CRS in the subframe may be determined according to an antenna number and the number of OFDM symbols in a resource block. The frequency-domain position of the CRS in the subframe may be determined according to an antenna number, a cell ID, an OFDM symbol index l, a slot number in a radio frame, etc.

The CRS sequence may be applied on an OFDM symbol basis in one subframe. The CRS sequence may differ according to a cell ID, a slot number in one radio frame, an OFDM symbol index in a slot, a CP type, etc. The number of RS subcarriers for each antenna on one OFDM symbol is 2. When a subframe includes $N_{RB}$ resource blocks in a frequency domain, the number of RS subcarriers for each antenna on one OFDM symbol is $2(N_{RB})$. Therefore, a length of the CRS sequence is $2(N_{RB})$.

Equation 1 shows an example of a CRS sequence r(m).

$$r(m) = \frac{1}{\sqrt{2}}(1 - 2 \cdot c(2m)) + j\frac{1}{\sqrt{2}}(1 - 2 \cdot c(2m+1)) \quad \text{[Math. 2]}$$

Herein, m is 0, 1, ..., $2N_{RB,max}-1$. $N_{RB,max}$ denotes the number of resource blocks corresponding to a maximum bandwidth. For example, when using a 3GPP LTE system, $N_{RB,max}$ is 110. c(i) denotes a PN sequence as a pseudo-random sequence, and can be defined by a gold sequence having a length of 31. Equation 2 shows an example of a gold sequence c(n).

$$c(n)=(x_1(n+N_C)+x_2(n+N_C)) \bmod 2 \; x_1(n+31)=(x_1(n+3)+ x_1(n)) \bmod 2 \; x_2(n+31)=(x_2(n+3)+x_2(n+2)+x_2(n+1)+x_2(n)) \bmod 2 \quad \text{[Math. 3]}$$

Herein, $N_C$ is 1600, $x_1(i)$ denotes a $1^{st}$ m-sequence, and $x_2(i)$ denotes a $2^{nd}$ m-sequence. For example, the $1^{st}$ m-sequence or the $2^{nd}$ m-sequence can be initialized for each OFDM symbol according to a cell ID, a slot number in one radio frame, an OFDM symbol index in a slot, a CP type, etc.

In case of using a system having a bandwidth narrower than $N_{RB,max}$, a certain part with a length of $2(N_{RB})$ can be selected from an RS sequence generated in a length of $2(N_{RB,max})$.

The CRS may be used in the LTE-A system to estimate channel state information (CSI). If necessary for estimation of the CSI, channel quality indicator (CQI), a precoding matrix indicator (PMI), a rank indicator (RI), or the like may be reported from the UE. A UE-specific RS may be used in the LTE-A system to demodulate a PDSCH. In this case, the PDSCH and the UE-specific RS may follow the same precoding operation.

Some embodiments of a proposed method of transmitting a reference signal are described below. In the following description, a CSI-RS refers to a Channel State Information (CSI) reference signal for estimating CSI for LTE-A system. A CRS refers to a cell-specific reference signal for estimating channel for LTE rel-8 system. It is, however, to be noted the present invention is not limited to the CSI-RS, but can be applied to various reference signals.

Figure 9:
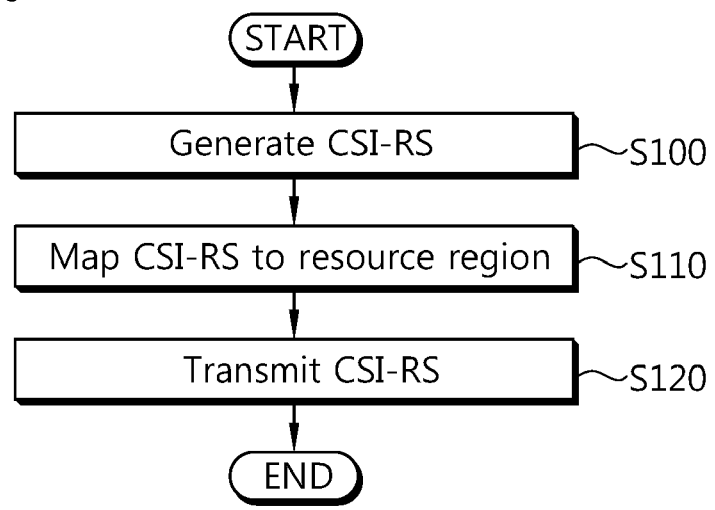
FIG. 9 is a diagram showing an embodiment of a proposed method of transmitting a reference signal.

FIG. 9 is a diagram showing an embodiment of a proposed method of transmitting a reference signal.

At step S100, a base station generates CSI-RSs for each of a plurality of antennas. At step S110, the base station maps the CSI-RSs to a resource region on the basis of a CSI-RS pattern according to the number of the plurality of antennas. At step S120, the base station transmits the mapped CSI-RSs to a user equipment.

In mapping the CSI-RSs to the resource region, the CSI-RS pattern in the resource region can be adaptively changed depending on a pattern of CRSs for legacy antennas. An LTE-A system can support a maximum of 8 transmission antennas. The antenna for the LTE-A system can be referred to as an extended antenna. The CSI-RS can be mapped to each transmission antenna. Meanwhile, an LTE rel-8 system can support up to four legacy antennas. The CSI-RS can be mapped to each legacy antenna. If the CRS for the legacy antenna is solely used for the LTE rel-8 system, a new pattern for CSI-RS of an extended antenna for the LTE-A system in the resource region needs to be configured. Alternatively, some of CRSs for the existing legacy antennas are used for transmission antennas for the LTE-A system, and additional CSI-RSs having the same number as the remaining extended antennas can be assigned to the resource region and transmitted. In this case, when the CSI-RSs for the extended antennas are mapped to the resource region, a pattern of the CRSs for the legacy antennas needs to be taken into consideration.

First, a case in which a pattern of CSI-RSs for eight extended antennas for LTE-A system is newly configured is described. This corresponds to a case in which CRSs for legacy antennas are solely used for the LTE rel-8 system. The CSI-RSs for the eight extended antennas for the LTE-A system must be newly supported, and a new pattern of the CSI-RSs needs to be configured in the resource region. The CSI-RSs for the eight extended antennas can be always transmitted irrespective of the number of layers used to transmit a subframe set to transmit CSI-RSs. The subframe set to transmit the CSI-RSs can have a flexible or fixed cycle. The cycle of the subframe can be any one of 2 ms, 5 ms, 8 ms, 10 ms, 20 ms, and 40 ms.

Figure 10:
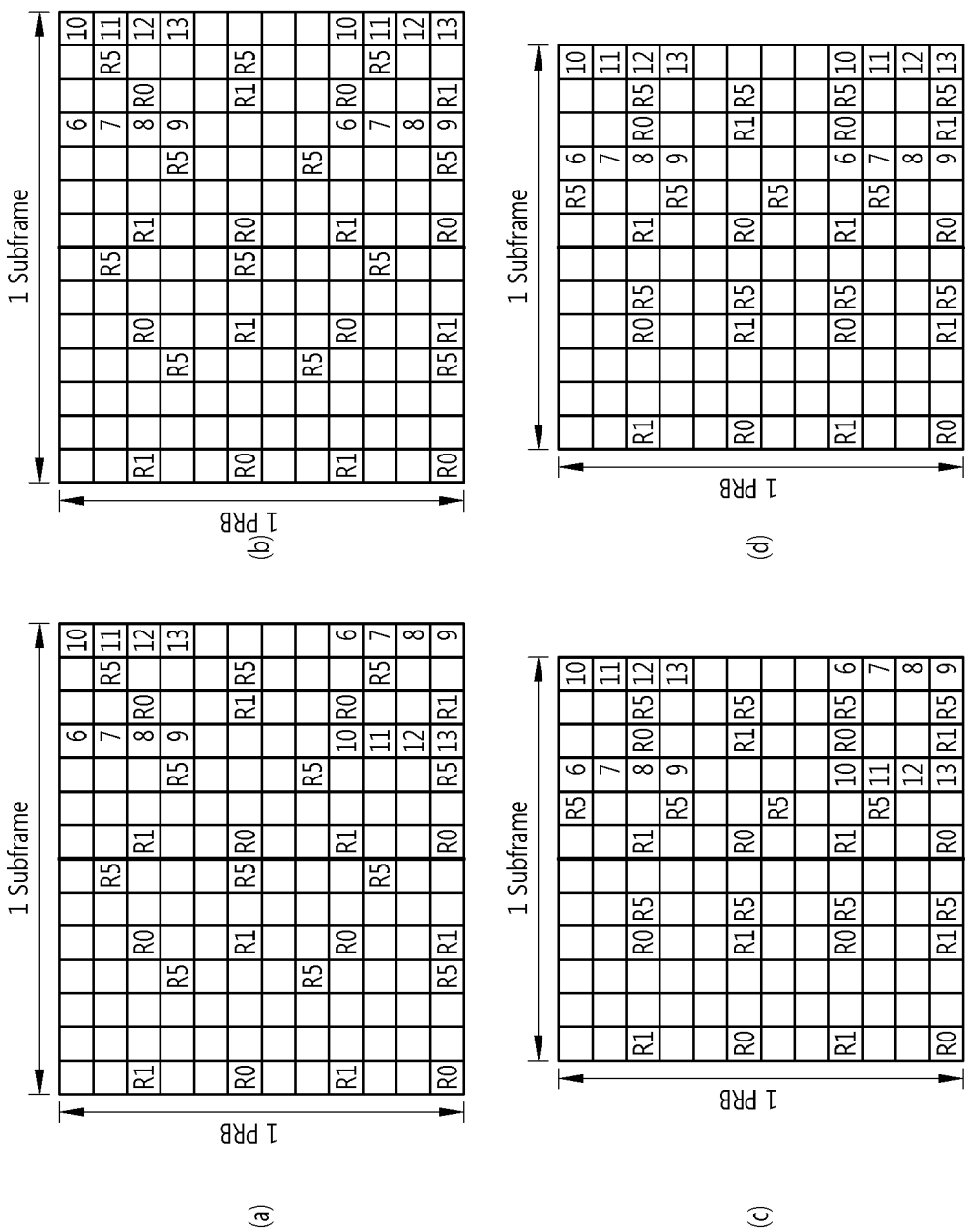
FIG. 10 shows an example of a pattern of CSI-RSs within one subframe according to the proposed method of transmitting a reference signal.

FIG. 10 shows an example of a pattern of CSI-RSs within one subframe according to the proposed method of transmitting a reference signal. R0 and R1 refer to positions to which respective CRSs for legacy antennas are mapped, R5 refers to a position to which a dedicated reference signal is mapped, and R6 to R13 refer to positions to which respective CSI-RSs for eight extended antennas are mapped. The CSI-RSs for the respective extended antennas can be mapped at an interval of 8 subcarriers in the frequency domain. For example, the CSI-RS '6' of an antenna port 6 can be mapped to a first subcarrier and a ninth subcarrier, and the CSI-RS '7' of an antenna port 7 can be mapped to a second subcarrier and a tenth subcarrier.

FIGS. 10(a) and 10(b) illustrate subframes a having normal CP. The CSI-RSs for extended antennas are mapped to the fourth OFDM symbol and seventh OFDM symbol of a second slot. In FIG. 10(a), the CSI-RSs of antenna ports 6 to 9 are sequentially mapped to the respective first to fourth subcarriers of a fourth OFDM symbol and the respective ninth to twelfth subcarriers of a seventh OFDM symbol, of a second slot. The CSI-RSs of antenna ports 10 to 13 are sequentially mapped to the respective ninth to twelfth subcarriers of a fourth OFDM symbol and the respective first to fourth subcarriers of a seventh OFDM symbol of the second slot. In FIG. 10(b), the CSI-RSs of antenna ports 6 to 9 are sequentially mapped to the respective first to fourth subcarriers and the respective ninth to twelfth subcarriers of a second slot. The CSI-RSs of antenna ports 10 to 13 are sequentially mapped to the respective first to fourth subcarriers and the respective ninth to twelfth subcarriers, of a seventh OFDM symbol of the second slot. FIGS. 10(c) and 10(d) illustrate subframes having an extended CP. The CSI-RSs for extended antennas are mapped to the third OFDM symbol and sixth OFDM symbol of the second slot. The patterns of subcarriers to which the CSI-RSs for the extended antennas are mapped, in FIGS. 10(c) and 10(d), are identical with those of FIGS. 10(a) and 10(b), respectively.

Figure 11:
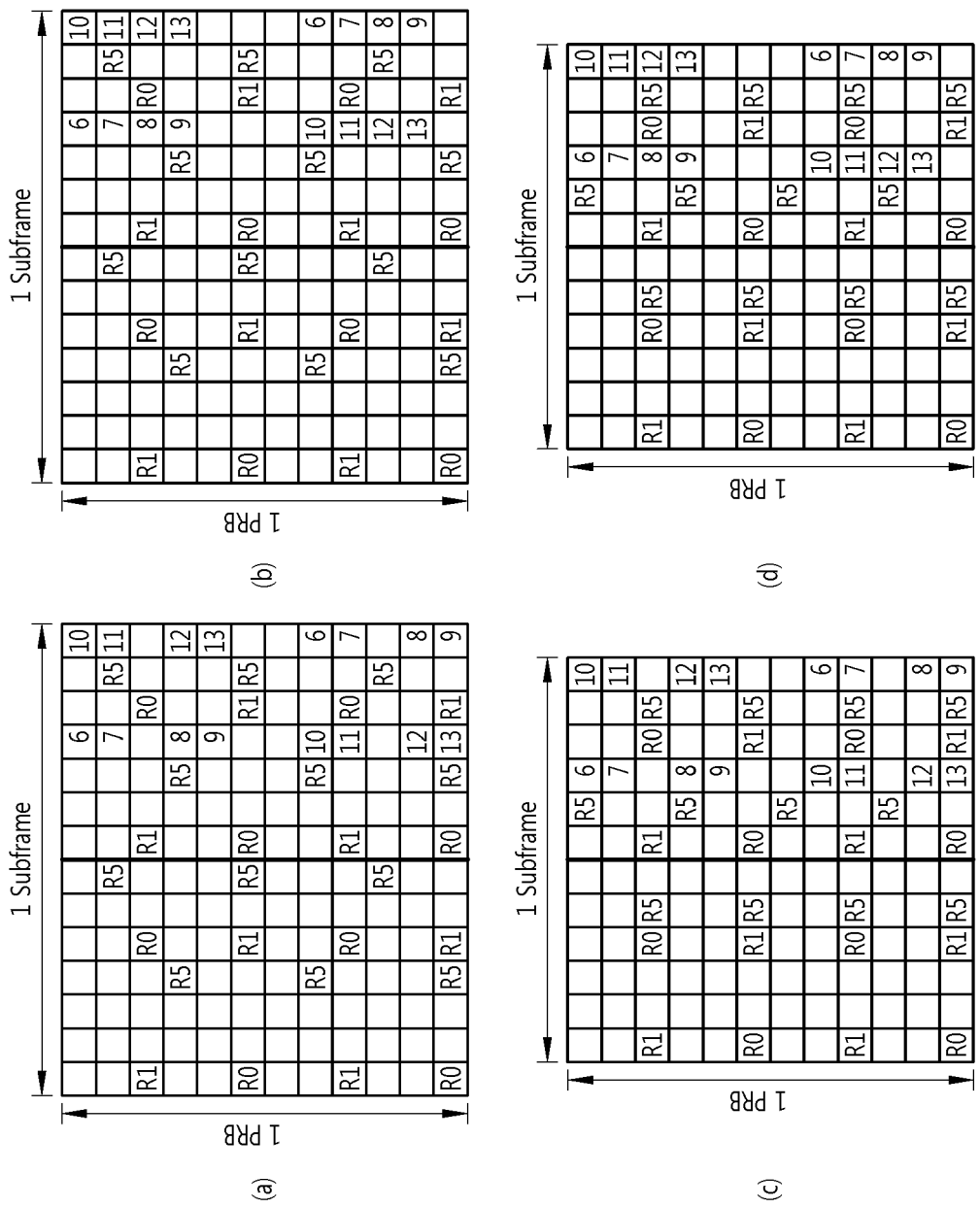
FIG. 11 to FIG. 21 shows another example of a pattern of CSI-RSs within one subframe according to the proposed method of transmitting a reference signal.

FIG. 11 shows another example of a pattern of CSI-RSs within one subframe according to the proposed method of transmitting a reference signal. The CSI-RSs for respective extended antennas are mapped at an interval of 7 subcarriers in the frequency domain. For example, the CSI-RS '6' of an antenna port 6 can be mapped to a first subcarrier and an eight subcarrier, and the CSI-RS '7' of an antenna port 7 can be mapped to a second subcarrier and a ninth subcarrier.

FIGS. 11(a) and 11(b) illustrate subframes having a normal CP. The CSI-RSs for the extended antennas are mapped to the fourth OFDM symbol and seventh OFDM symbol of a second slot. In FIG. 11(a), the CSI-RSs of antenna ports 6 to 9 are sequentially mapped to the respective first, second, fourth, and fifth subcarriers of a fourth OFDM symbol and the respective eighth, ninth, eleventh, and twelfth subcarriers of a seventh OFDM symbol of the second slot. The CSI-RSs of antenna ports 10 to 13 are sequentially mapped to the respective eighth, ninth, eleventh, and twelfth subcarriers of a fourth OFDM symbol and the respective first, second, fourth, and fifth subcarriers of a seventh OFDM symbol of the second slot. In FIG. 11(b), the CSI-RSs of antenna ports 6 to 9 are sequentially mapped to the respective first to fourth subcarriers of a fourth OFDM symbol and the respective eighth to eleventh subcarriers of a seventh OFDM symbol of the second slot. The CSI-RSs of antenna ports 10 to 13 are sequentially mapped to the respective eighth to eleventh subcarriers of a fourth OFDM symbol and the respective first to fourth subcarriers of a seventh OFDM symbol of the second slot. FIGS. 11(c) and 11(d) illustrate subframes having an extended CP. CSI-RSs for extended antennas are mapped to the third OFDM symbol and sixth OFDM symbol of a second slot. The patterns of subcarriers to which the CSI-RSs for the extended antennas are mapped, in FIGS. 11(c) and 11(d), are identical with those of FIGS. 11(a) and 11(b), respectively.

Figure 12:
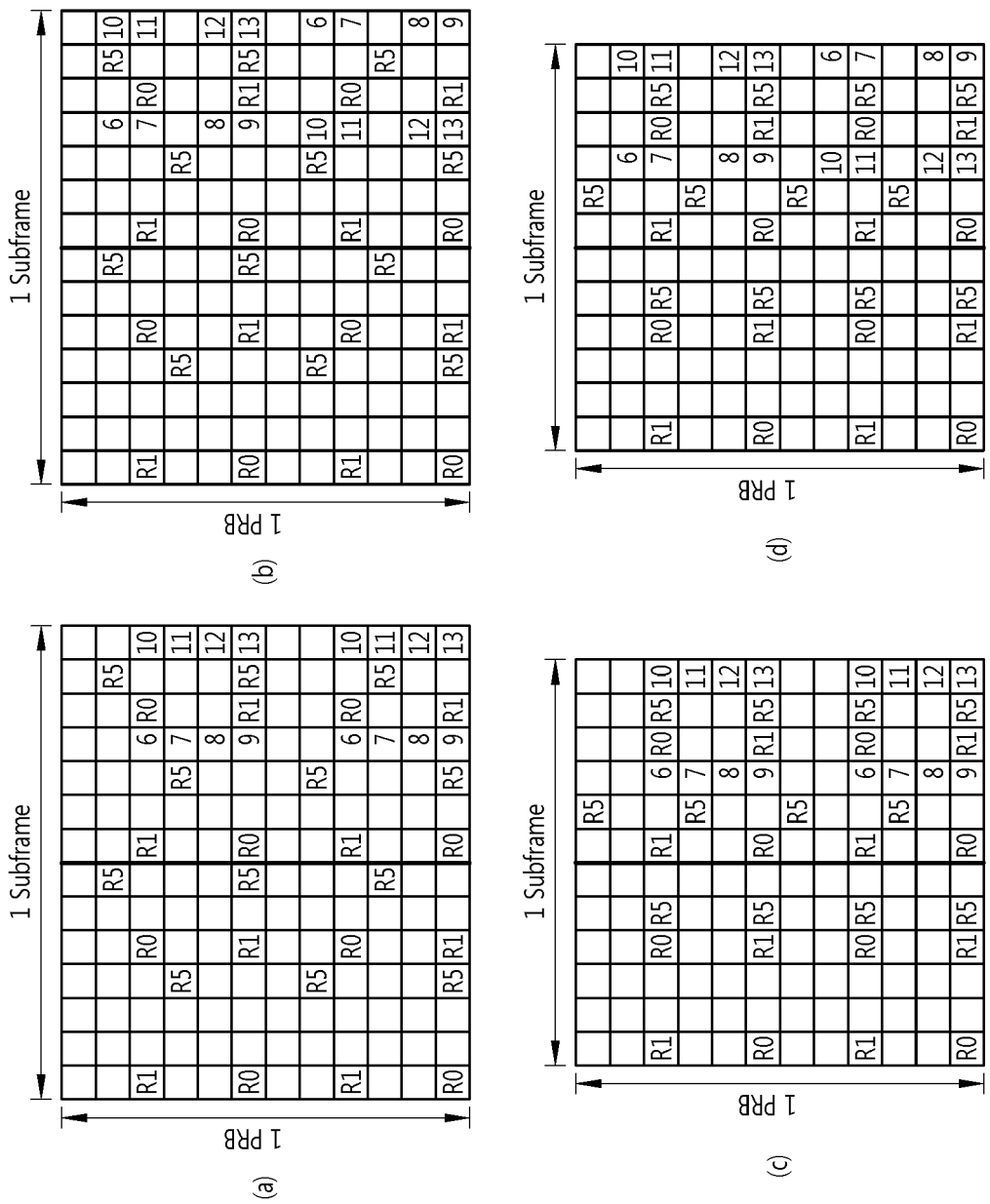

FIG. 12 shows another example of a pattern of CSI-RSs within one subframe according to the proposed method of transmitting a reference signal. The CSI-RSs for the respective extended antennas can be mapped at an interval of 6 subcarriers in the frequency domain. For example, the CSI-RS '6' of an antenna port 6 can be mapped to a third subcarrier and a ninth subcarrier, and the CSI-RS '7' of an antenna port 7 can be mapped to a fourth subcarrier and a tenth subcarrier.

FIGS. 12(a) and 12(b) illustrate subframes having an extended CP. The CSI-RS for the extended antenna is mapped to the fourth OFDM symbol and seventh OFDM symbol of a second slot. In FIG. 12(a), the CSI-RSs of antenna ports 6 to 9 are sequentially mapped to the respective three to sixth subcarriers and respective ninth to twelfth subcarriers of a fourth OFDM symbol of the second slot. The CSI-RSs of antenna ports 10 to 13 are sequentially mapped to the respective three to sixth subcarriers and respective ninth to twelfth subcarriers of a seventh OFDM symbol of the second slot. In FIG. 12(b), the CSI-RSs of antenna ports 6 to 9 are sequentially mapped to the respective second, third, fifth, and sixth subcarriers of a fourth OFDM symbol and the respective eighth, ninth, eleventh, and twelfth subcarriers of a seventh OFDM symbol of the second slot. The CSI-RSs of antenna ports 10 to 13 are sequentially mapped to the respective eighth, ninth, eleventh, and twelfth subcarriers of a fourth OFDM symbol and the respective second, third, fifth, and sixth subcarriers of a seventh OFDM symbol of the second slot. FIGS. 12(c) and 12(d) illustrate subframes having an extended CP. The CSI-RSs for extended antennas are mapped to the third OFDM symbol and sixth OFDM symbol of a second slot. The patterns of subcarriers to which the CSI-RSs for the extended antennas are mapped, in FIGS. 12(c) and 12(d), are identical with those of FIGS. 12(a) and 12(b), respectively.

Figure 13:
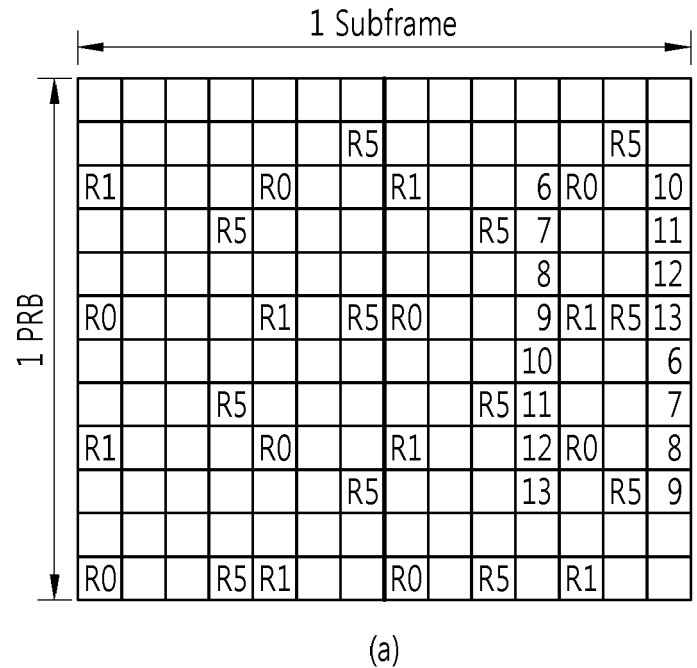
Figure 13:
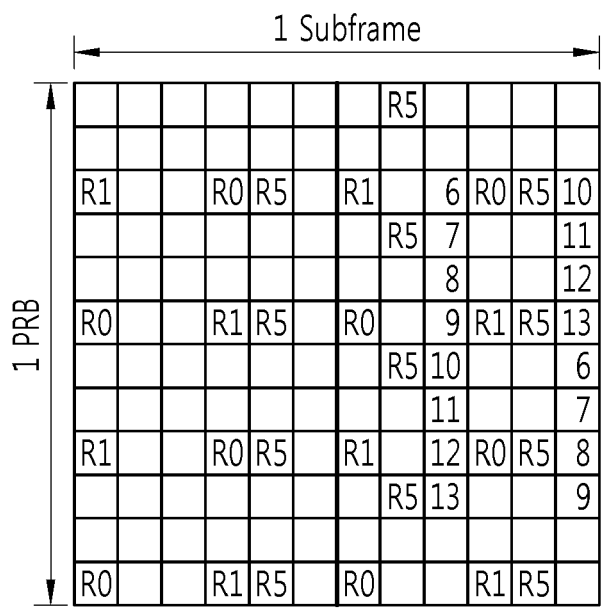

FIG. 13 shows another example of a pattern of CSI-RSs within one subframe according to the proposed method of transmitting a reference signal. The CSI-RSs for the respective extended antennas can be mapped at an interval of 4 subcarriers in the frequency domain. For example, the CSI-RS '6' of an antenna port 6 can be mapped to a third subcarrier and a seventh subcarrier, and the CSI-RS '7' of an antenna port 7 can be mapped to a fourth subcarrier and an eighth subcarrier.

FIG. 13(a) illustrates a subframe having a normal CP. The CSI-RSs for extended antennas are mapped to the fourth OFDM symbol and seventh OFDM symbol of the second slot. In FIG. 13(a), the CSI-RSs of antenna ports 6 to 9 are sequentially mapped to the respective three to sixth subcarriers of a fourth OFDM symbol and the respective seventh to tenth subcarriers of a seventh OFDM symbol of the second slot. The CSI-RSs of antenna ports 10 to 13 are sequentially mapped to the respective seventh to tenth subcarriers of a fourth OFDM symbol and the respective three to sixth subcarriers of a seventh OFDM symbol of the second slot. FIG. 13(*b*) illustrates a subframe having a normal CP. The CSI-RSs for extended antennas are mapped to the third OFDM symbol and sixth OFDM symbol of a second slot. The pattern of subcarriers to which the CSI-RSs for the extended antennas are mapped, in FIG. 13(*b*), is identical with that of FIG. 13(*a*).

Figure 14:
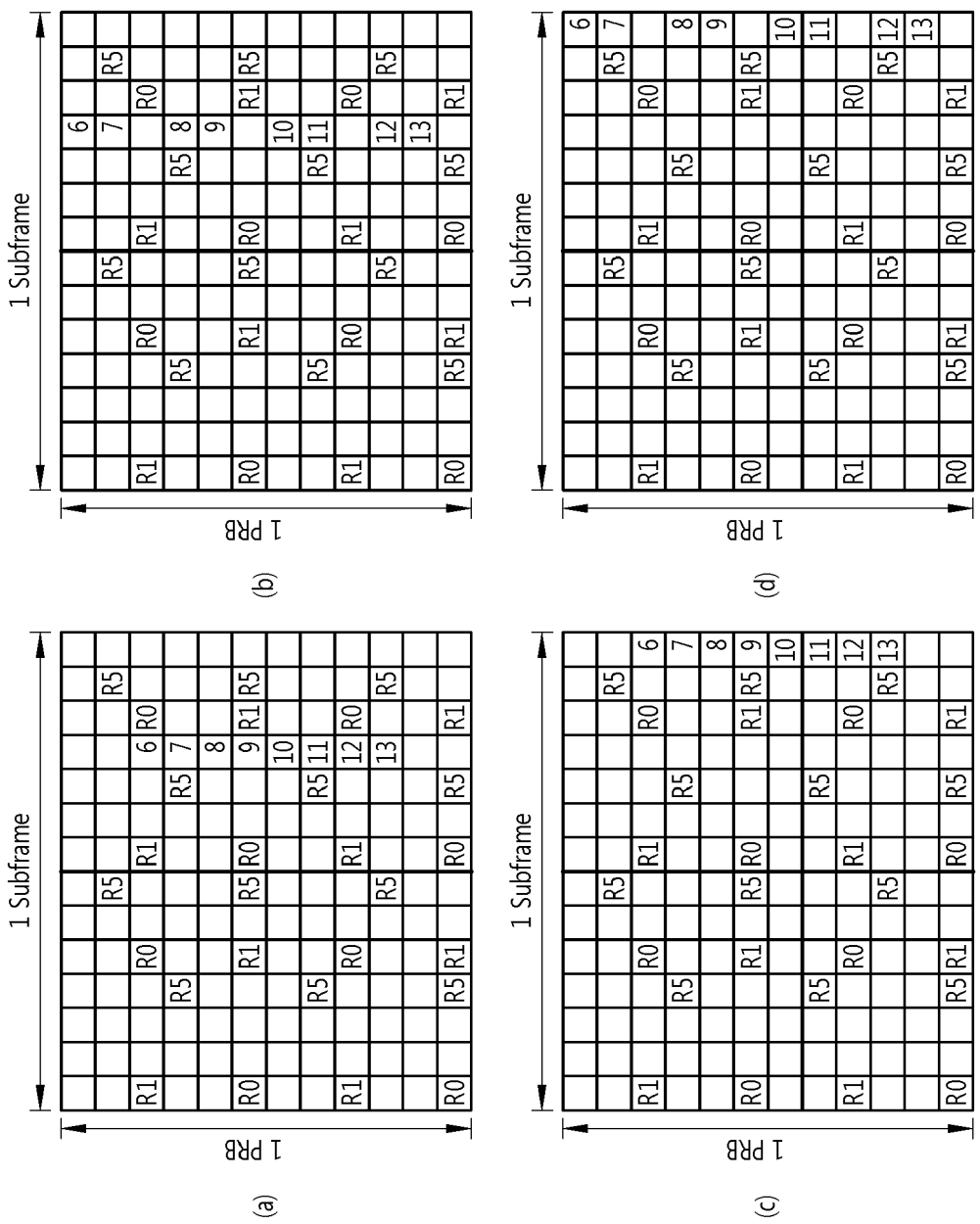
Figure 15:
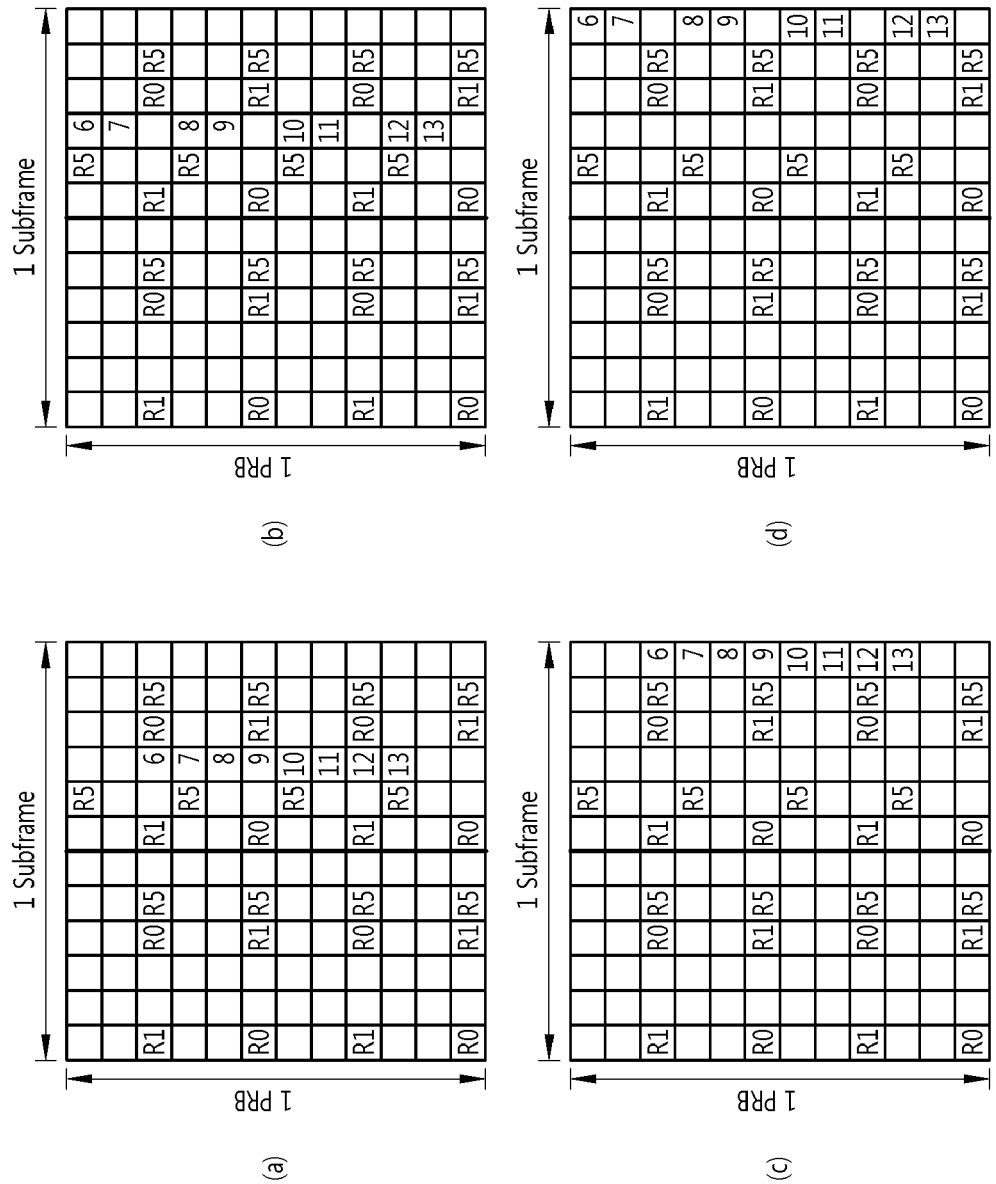

FIG. 14 to FIG. 15 shows another example of a pattern of CSI-RSs within one subframe according to the proposed method of transmitting a reference signal. The CSI-RSs for the respective extended antennas can be mapped at an interval of 12 subcarriers in the frequency domain. That is, only one CSI-RS for one extended antenna is transmitted within one resource block.

FIGS. 14(*a*) to 14(*d*) illustrate subframes having a normal CP. The CSI-RSs for the extended antennas are mapped to the fourth OFDM symbol or seventh OFDM symbol of a second slot. In FIG. 14(*a*), the CSI-RSs of antenna ports 6 to 13 are sequentially mapped to the respective three to tenth subcarriers of a fourth OFDM symbol of the second slot. In FIG. 14(*b*), the CSI-RSs of antenna ports 6 to 13 are sequentially mapped to the respective first, second, fourth, fifth, seventh, eighth, tenth, and eleventh subcarriers of a fourth OFDM symbol of the second slot. In FIG. 14(*c*), the CSI-RSs of antenna ports 6 to 13 are sequentially mapped to the respective three to tenth subcarriers of a seventh OFDM symbol of the second slot. In FIG. 14(*d*), the CSI-RSs of antenna ports 6 to 13 are sequentially mapped to the respective first, second, fourth, fifth, seventh, eighth, tenth, and eleventh subcarriers of a seventh OFDM symbol of the second slot. FIGS. 15(*a*) to 15(*d*) illustrate subframes having an extended CP. The CSI-RSs for the extended antennas are mapped to the third OFDM symbol or sixth OFDM symbol of a second slot. The patterns of subcarriers to which the CSI-RSs for the extended antennas are mapped, in FIGS. 15(*a*) and 15(*d*), are identical with those of FIGS. 14(*a*) and 14(*d*), respectively.

Figure 16:
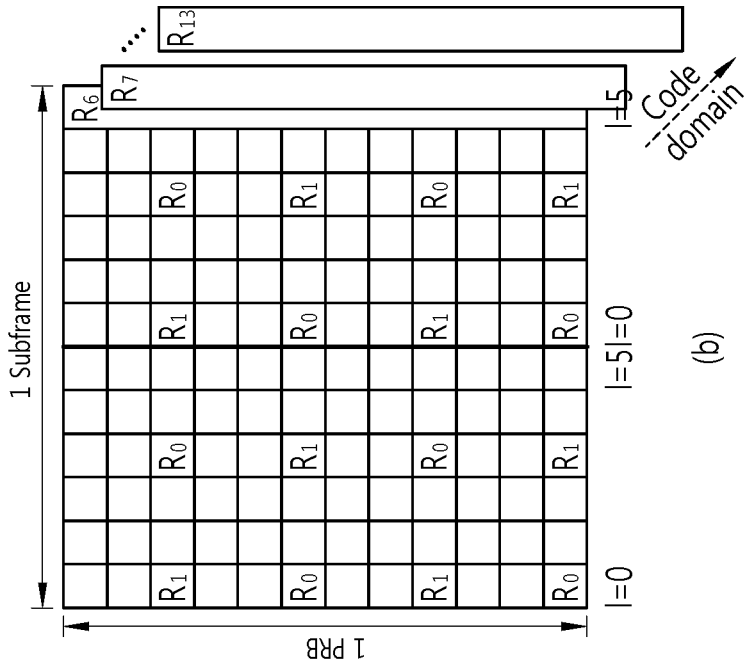
Figure 16:
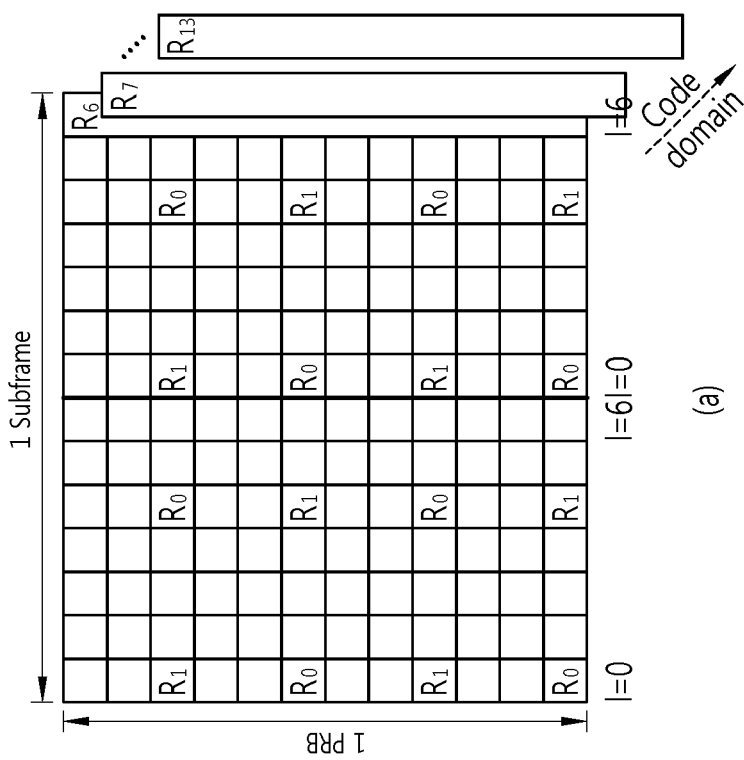

FIG. 16 shows another example of a pattern of CSI-RSs within one subframe according to the proposed method of transmitting a reference signal. The CSI-RS for respective extended antennas are subject to Code Division Multiplexing (CDM) in the last OFDM symbol of a subframe. The CSI-RS can occupy all the corresponding OFDM symbols within one resource block. FIG. 16(*a*) illustrates a subframe having a normal CP, and FIG. 16(*b*) illustrates a subframe having an extended CP.

In the above example, the CSI-RSs of extended antenna ports can have their positions, mapped in the resource region, exchanged each other. Further, the position of a subcarrier to which a CSI-RS is mapped within an OFDM symbol can be changed by controlling a subcarrier offset value. For example, in FIG. 12(*a*), the CSI-RS of an extended antenna port 6 can have a subcarrier offset value of 2 since it is transmitted in a third subcarrier. The subcarrier offset value can have any one of 0 to 2. When the subcarrier offset value is 0, the CSI-RSs of antenna ports 6 to 9 can be mapped to the respective first to fourth subcarriers and respective seventh to tenth subcarriers of the fourth OFDM symbol of a second slot. The CSI-RSs of antenna ports 10 to 13 can be mapped to the respective first to fourth subcarriers and respective seventh to tenth subcarriers of a seventh OFDM symbol of the second slot.

In mapping the CSI-RSs to the resource region, when CSI-RSs are transmitted in an OFDM symbol in which a PDCCH or the CRSs of a legacy antenna are not transmitted, a channel state can be estimated more accurately. It is also necessary to exclude an OFDM symbol assigned to a Demodulation RS (DMRS) used as a reference signal for UE measurement. In other words, in the case of the normal CP, an OFDM symbol to which CSI-RSs for extended antennas are mapped can be one or more of the sixth, ninth, $(2N_{symbol}-3)^{th}$, and last OFDM symbols of a subframe. In the normal CP, $N_{symbol}$ can be 7. In the case of the extended CP, an OFDM symbol to which CSI-RSs for extended antennas are mapped can be one or more of the sixth, $(2N_{symbol}-3)^{th}$, and last OFDM symbols of a subframe. In the extended CP, $N_{symbol}$ can be 6.

Meanwhile, the CSI-RSs for the eight extended antennas can be always transmitted irrespective of the number of layers used to transmit a subframe in which CSI-RSs are transmitted. The subframe set to transmit the CSI-RSs can have a flexible or fixed cycle. The cycle of the subframe can be any one of 2 ms, 5 ms, 8 ms, 10 ms, 20 ms, and 40 ms. Here, the CSI-RSs can be mapped to the resource region with a low density. The CSI-RSs for the respective extended antennas can be mapped to the resource region at an interval of any one of 3 subcarriers, 6 subcarriers, 7 subcarriers, 8 subcarriers, 9 subcarriers, and 12 subcarriers in the frequency domain. The subframe set to transmit the CSI-RSs can have a flexible or fixed cycle. The cycle of the subframe can be any one of 2 ms, 5 ms, 8 ms, 10 ms, 20 ms, and 40 ms. Further, in order to track a time-varying channel other than basically transmitted CSI-RSs, additional CSI-RSs can be transmitted. The additional CSI-RSs can be configured in a cell-specific manner or can be signaled by a higher layer and configured. The additional CSI-RSs can be transmitted in both a subframe in which CSI-RSs for extended antennas are transmitted and a subframe in which CSI-RSs for extended antennas are not transmitted. A subframe in which the additional CSI-RSs are transmitted can have a flexible or fixed cycle. The cycle of the subframe can be any one of 2 ms, 5 ms, 8 ms, 10 ms, 20 ms, and 40 ms. A pattern in the resource region of the additional CSI-RSs can be any one of the patterns shown in FIGS. 10 to 16.

Hereinafter, a case in which CRSs for two legacy antennas and CSI-RSs for six extended antennas are used in order to support CSI-RSs for eight extended antennas is described. To support eight transmission antennas of an LTE-A system, the CRSs for two legacy antennas (antenna ports 0 and 1) can be used as some of the CSI-RS for eight transmission antennas. The CRSs for the legacy antennas can be used as the CSI-RSs for some of the eight transmission antennas without change. Accordingly, there is a need for a method of mapping the CSI-RSs for the remaining six extended antennas to the resource region. The CSI-RSs for the six extended antennas can be always transmitted irrespective of the number of layers used to transmit a subframe in which CSI-RS are transmitted. The subframe set to transmit the CSI-RSs can have a flexible or fixed cycle. The cycle of the subframe can be any one of 2 ms, 5 ms, 8 ms, 10 ms, 20 ms, and 40 ms.

Figure 17:
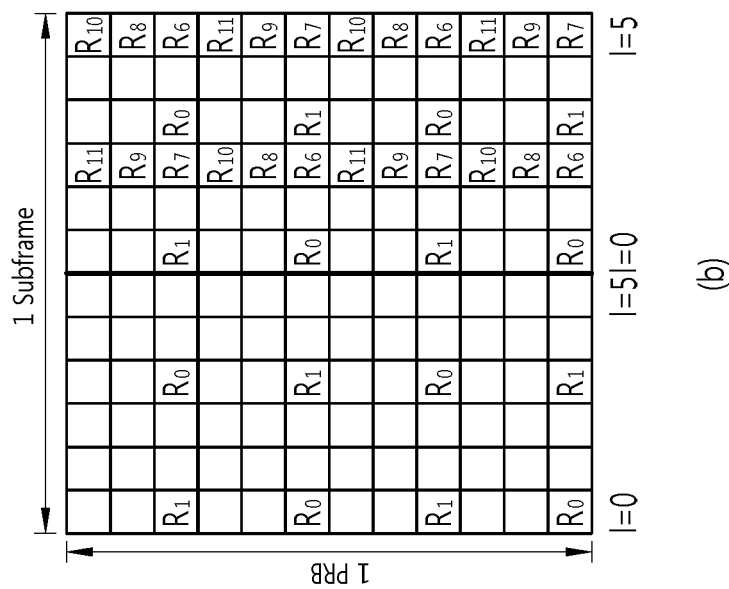
Figure 17:
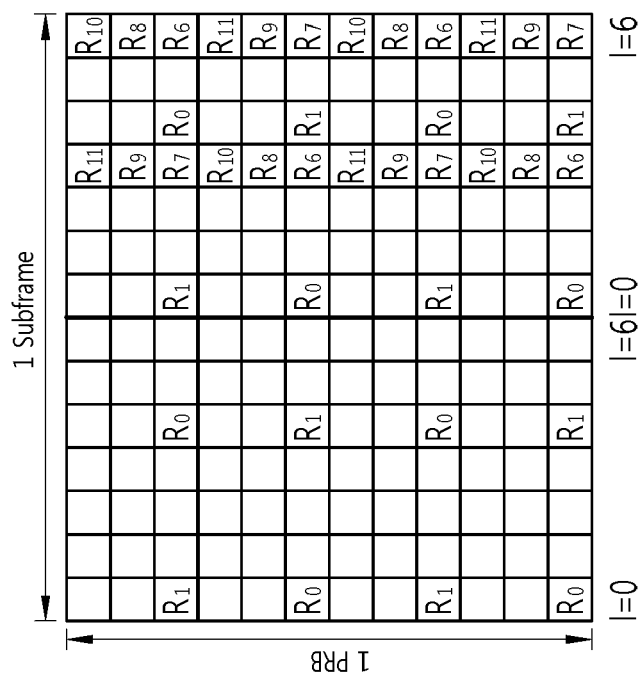

FIG. 17 shows another example of a pattern of CSI-RSs within one subframe according to the proposed method of transmitting a reference signal. R0 and R1 refer to positions to which CRSs for respective legacy antenna are mapped, and R6 to R11 refer to positions to which CSI-RSs for respective six extended antennas are mapped. The CSI-RSs for the respective extended antennas are mapped at an interval of three subcarriers in the frequency domain. For example, the CSI-RS '6' of an antenna port 6 can be mapped to third, sixth, ninth, and twelfth subcarriers, and the CSI-RS '8' of an antenna port 8 can be mapped to second, fifth, eighth, and eleventh subcarriers.

FIG. 17(a) illustrates a subframe having a normal CP. The CSI-RSs for the extended antennas are mapped to the fourth OFDM symbol and seventh OFDM symbol of a second slot. The CSI-RSs of antenna ports 10, 8, and 6 are sequentially mapped to the respective fourth to sixth subcarriers and respective tenth to twelfth subcarriers of a fourth OFDM symbol and the respective first to third subcarriers and respective seventh to ninth subcarriers of a seventh OFDM symbol of a second slot. The CSI-RSs of antenna ports 11, 9, and 7 are sequentially mapped to the respective first to third subcarriers and respective seventh to ninth subcarriers of a fourth OFDM symbol and the respective fourth to sixth subcarriers and respective tenth to twelfth subcarriers of a seventh OFDM symbol of the second slot. FIG. 17(b) illustrates a subframe having an extended CP. The CSI-RSs for extended antennas are mapped to the third OFDM symbol and sixth OFDM symbol of a second slot. The pattern of subcarriers to which the CSI-RSs for the extended antennas are mapped, in FIG. 17(b), is identical with that of FIG. 17(a).

Figure 18:
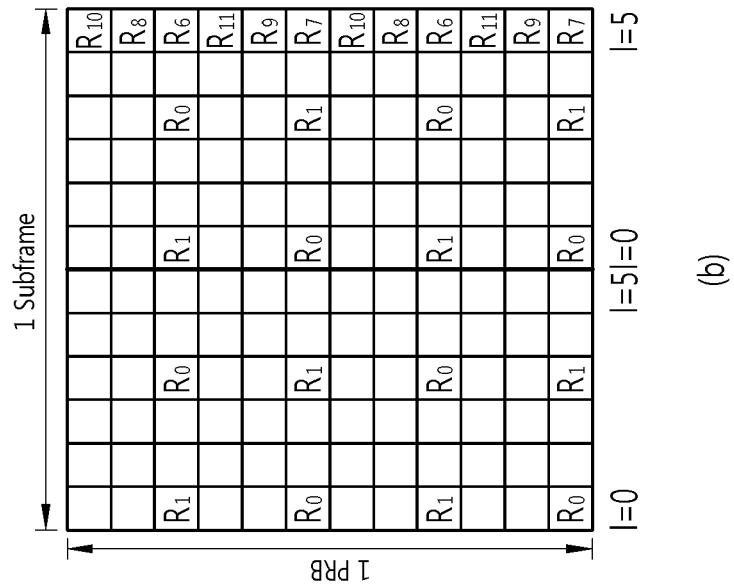
Figure 18:
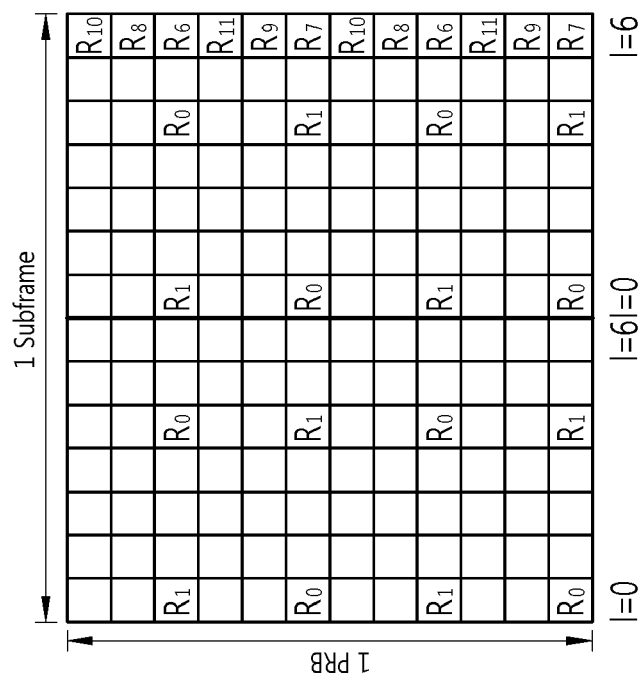

FIG. 18 shows another example of a pattern of CSI-RSs within one subframe according to the proposed method of transmitting a reference signal. R0 and R1 refer to positions to which CRSs for respective legacy antenna are mapped, and R6 to R11 refer to positions to which CSI-RSs for respective six extended antennas are mapped. The CSI-RSs for the respective extended antennas are mapped at an interval of six subcarriers in the frequency domain. For example, the CSI-RS '6' of an antenna port 6 can be mapped to third and ninth subcarriers, and the CSI-RS '7' of an antenna port 7 can be mapped to sixth and twelfth subcarriers.

FIG. 18(a) illustrates a subframe having a normal CP. The CSI-RSs for extended antennas are mapped to the seventh OFDM symbol of a second slot (i.e., the last OFDM symbol of the subframe). The CSI-RSs of antenna ports 10, 8, 6, 11, 9, and 7 are sequentially mapped to the respective first to sixth subcarriers and respective seventh to twelfth subcarriers of a last OFDM symbol. FIG. 18(b) illustrates a subframe having an extended CP. The CSI-RSs for extended antennas are also mapped to the last OFDM symbol of the subframe. The pattern of subcarriers to which the CSI-RSs for the extended antennas are mapped, in FIG. 18(b), is identical with that of FIG. 18(a).

Figure 19:
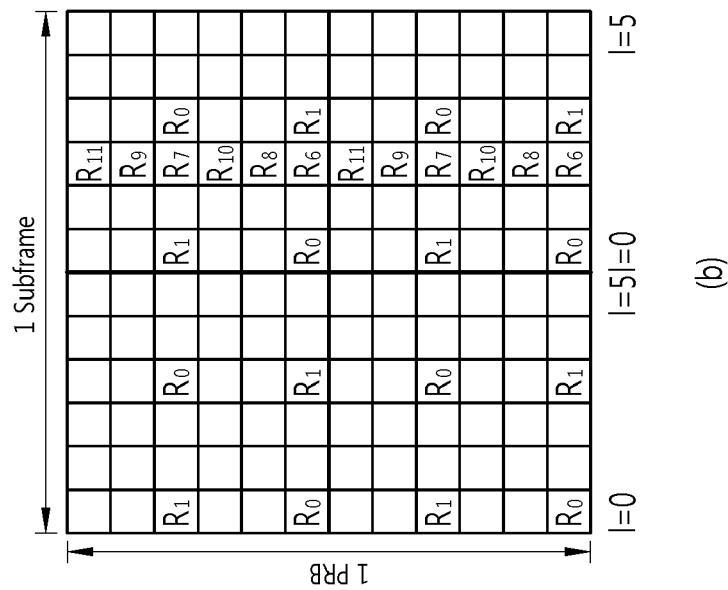
Figure 19:
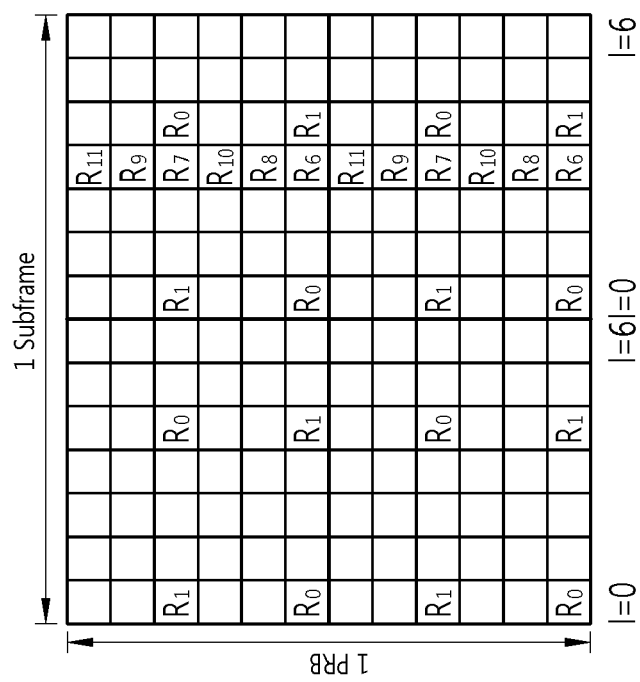
Figure 20:
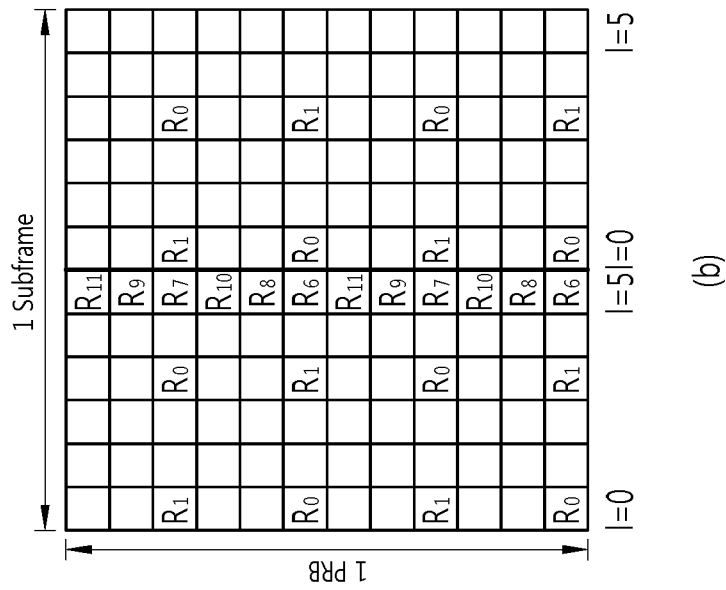
Figure 20:
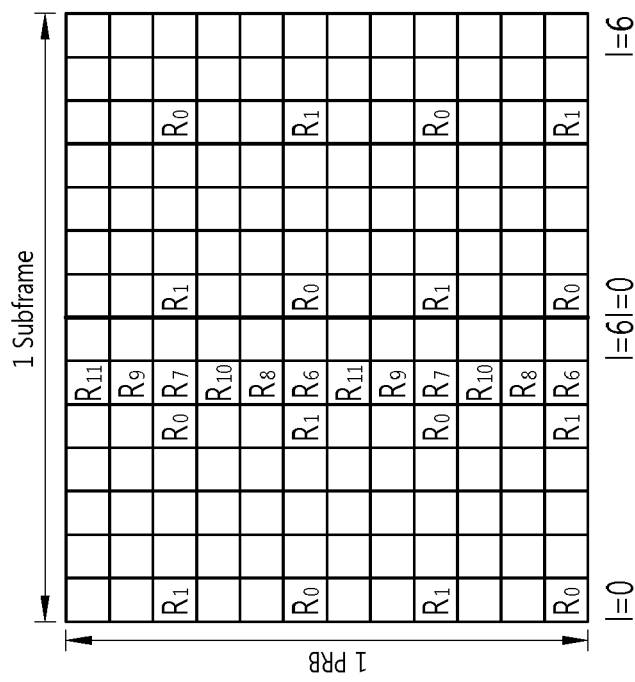

FIGS. 19 and 20 show another example of patterns of CSI-RSs within one subframe according to the proposed method of transmitting a reference signal. R0 and R1 refer to positions to which CRSs for respective legacy antenna are mapped, and R6 to R11 refer to positions to which CSI-RSs for respective six extended antennas are mapped. The CSI-RSs for the extended antennas are mapped at an interval of six subcarriers in the frequency domain as in FIG. 18.

FIGS. 19(a) and 20(a) illustrate subframes each having a normal CP. In FIG. 19(a), the CSI-RSs for the extended antennas are mapped to the fourth OFDM symbol of a second slot. In FIG. 20(a), the CSI-RSs for the extended antennas are mapped to the sixth OFDM symbol of a first slot. The CSI-RSs of antenna ports 11, 9, 7, 10, 8, and 6 are sequentially mapped to the respective first to sixth subcarriers and respective seventh to twelfth subcarriers of a fourth OFDM symbol of the second slot. FIGS. 19(b) and 20(b) illustrate subframes each having an extended CP. In FIG. 19(b), the CSI-RSs for the extended antennas are mapped to the third OFDM symbol of a second slot. In FIG. 20(b), the CSI-RSs for the extended antennas are mapped to the sixth OFDM symbol of a first slot. The patterns of subcarriers to which the CSI-RSs for the extended antennas are mapped, in FIGS. 19(b) and 20(b), are identical with those of FIGS. 19(a) and 20(a), respectively.

Figure 21:
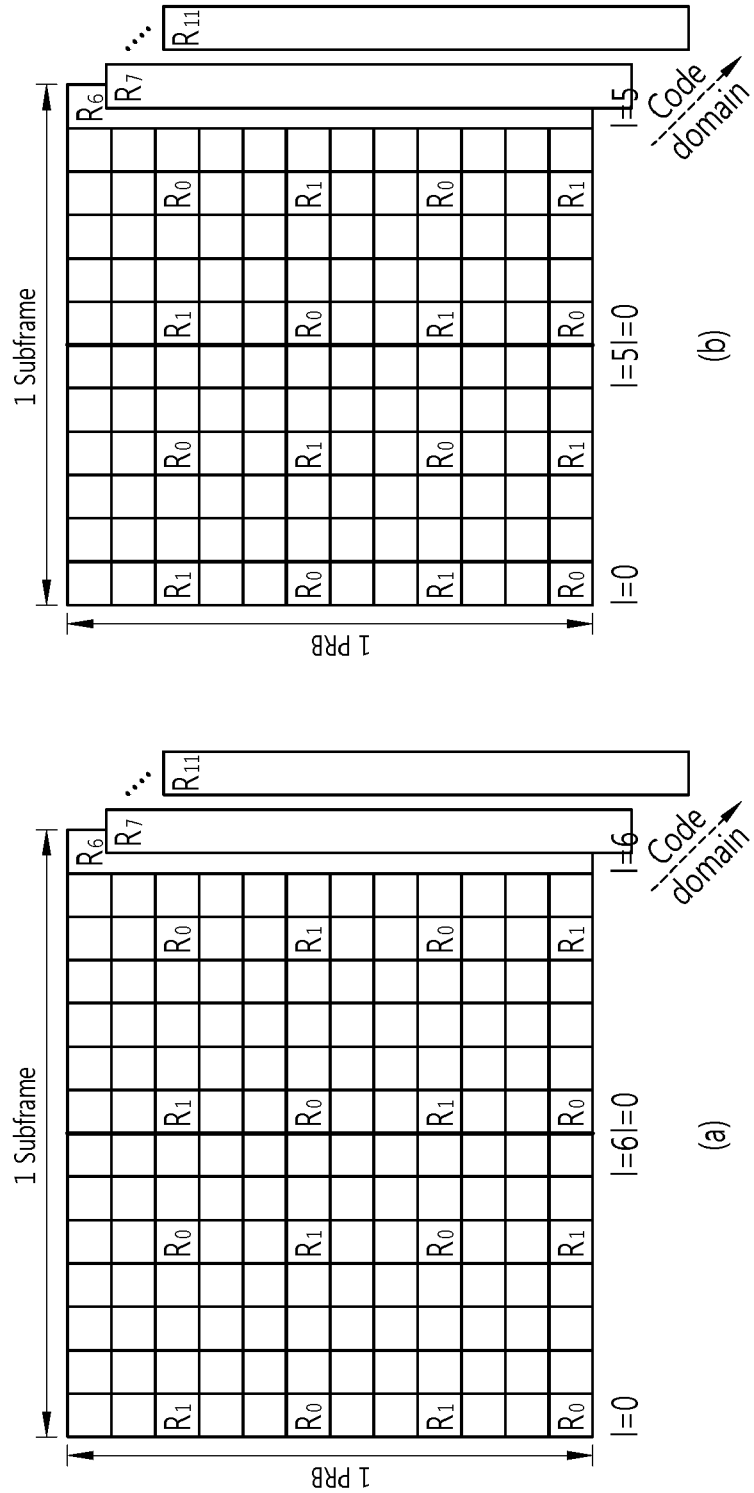

FIG. 21 shows another example of a pattern of CSI-RSs within one subframe according to the proposed method of transmitting a reference signal. The CSI-RSs for extended antennas are subject to CDM in the last OFDM symbol of the subframe. The CSI-RSs can occupy all the corresponding OFDM symbols within one resource block. FIG. 21(a) illustrates a subframe having a normal CP, and FIG. 21(b) illustrates a subframe having an extended CP.

In the above example, the CSI-RSs of extended antenna ports can have their positions, mapped in the resource region, exchanged each other. In mapping the CSI-RSs to the resource region, when the CSI-RSs are transmitted in an OFDM symbol in which a PDCCH or the CRSs of a legacy antenna are not transmitted, a channel state can be estimated more accurately. It is also necessary to exclude an OFDM symbol assigned to a Demodulation RS (DMRS) used as a reference signal for UE measurement. In other words, in the case of the normal CP, an OFDM symbol to which CSI-RSs for extended antennas are mapped can be one or more of the sixth, ninth, $(2N_{symbol}-3)^{th}$, and last OFDM symbols of a subframe. In the normal CP, $N_{symbol}$ can be 7. In the case of the extended CP, an OFDM symbol to which CSI-RSs for extended antennas are mapped can be one or more of the sixth, $(2N_{symbol}-3)^{th}$, and last OFDM symbols of a subframe. In the extended CP, $N_{symbol}$ can be 6.

Meanwhile, CSI-RSs for six extended antennas can be always transmitted irrespective of the number of layers used to transmit a subframe in which CSI-RSs are transmitted. Here, the CSI-RSs can be mapped to the resource region with a low density. The CSI-RSs for the respective extended antennas can be mapped to the resource region at an interval of any one of 3 subcarriers, 6 subcarriers, 9 subcarriers, and 12 subcarriers in the frequency domain. The subframe set to transmit the CSI-RSs can have a flexible or fixed cycle. The cycle of the subframe can be any one of 2 ms, 5 ms, 8 ms, 10 ms, 20 ms, and 40 ms. Further, in order to track a time-varying channel other than basically transmitted CSI-RSs, additional CSI-RSs can be transmitted. The additional CSI-RSs can be configured in a cell-specific manner or can be signaled by a higher layer and configured. The additional CSI-RSs can be transmitted in both a subframe in which CSI-RSs for extended antennas are transmitted and a subframe in which CSI-RSs for extended antennas are not transmitted. A subframe in which the additional CSI-RSs are transmitted can have a flexible or fixed cycle. The cycle of the subframe can be any one of 2 ms, 5 ms, 8 ms, 10 ms, 20 ms, and 40 ms. A pattern in the resource region of the additional CSI-RS can be any one of the patterns shown in FIGS. 16 to 20.

Further, CRSs for four legacy antennas and CSI_RSs for four extended antennas can be used in order to support CSI-RSs for eight extended antennas. To support the eight transmission antennas of an LTE-A system, the CRSs for the four legacy antennas (antenna ports 0 to 3) can be used as some of the CSI-RSs for eight transmission antennas. The CRSs for the legacy antennas can be used as CSI-RSs for some of the eight transmission antennas without change. The CSI-RSs for the four extended antennas can be always transmitted irrespective of the number of layers used to transmit a subframe set to transmit CSI-RSs. The subframe set to transmit the CSI-RSs can have a flexible or fixed cycle. The cycle of the subframe can be any one of 2 ms, 5 ms, 8 ms, 10 ms, 20 ms, and 40 ms.

In mapping CSI-RSs to a resource region, when CSI-RSs are transmitted in an OFDM symbol in which a PDCCH or the CRSs of a legacy antenna are not transmitted, a channel state can be estimated more accurately. It is also necessary to exclude an OFDM symbol assigned to a DMRS used as a reference signal for UE measurement. In other words, in the case of the normal CP, an OFDM symbol to which CSI-RSs for extended antennas are mapped can be one or more of the sixth, ninth, $(2N_{symbol}-3)^{th}$, and last OFDM symbols of a subframe. In the normal CP, $N_{symbol}$ can be 7. In the case of the extended CP, an OFDM symbol to which CSI-RSs for extended antennas are mapped can be one or more of the sixth, $(2N_{symbol}-3)^{th}$, and last OFDM symbols of a subframe. In the extended CP, $N_{symbol}$ can be 6.

Meanwhile, the CSI-RSs for the four extended antennas can be always transmitted irrespective of the number of layers used to transmit a subframe in which CSI-RSs are transmitted. Here, the CSI-RSs can be mapped to the resource region with a low density. The CSI-RSs for the respective extended antennas can be mapped to the resource region at an interval of any one of 3 subcarriers, 6 subcarriers, 9 subcarriers, and 12 subcarriers in the frequency domain. The subframe set to transmit the CSI-RSs can have a flexible or fixed cycle. The cycle of the subframe can be any one of 2 ms, 5 ms, 8 ms, 10 ms, 20 ms, and 40 ms. Further, in order to track a time-varying channel other than basically transmitted CSI-RSs, additional CSI-RSs can be transmitted. The additional CSI-RSs can be configured in a cell-specific manner or can be signaled by a higher layer and configured. The additional CSI-RSs can be transmitted in both a subframe in which CSI-RSs for extended antennas are transmitted and a subframe in which CSI-RSs for extended antennas are not transmitted. A subframe in which the additional CSI-RSs are transmitted can have a flexible or fixed cycle. The cycle of the subframe can be any one of 2 ms, 5 ms, 8 ms, 10 ms, 20 ms, and 40 ms. A pattern in the resource region of the additional CSI-RS can be any one of the patterns shown in FIGS. 16 to 20.

Figure 22:
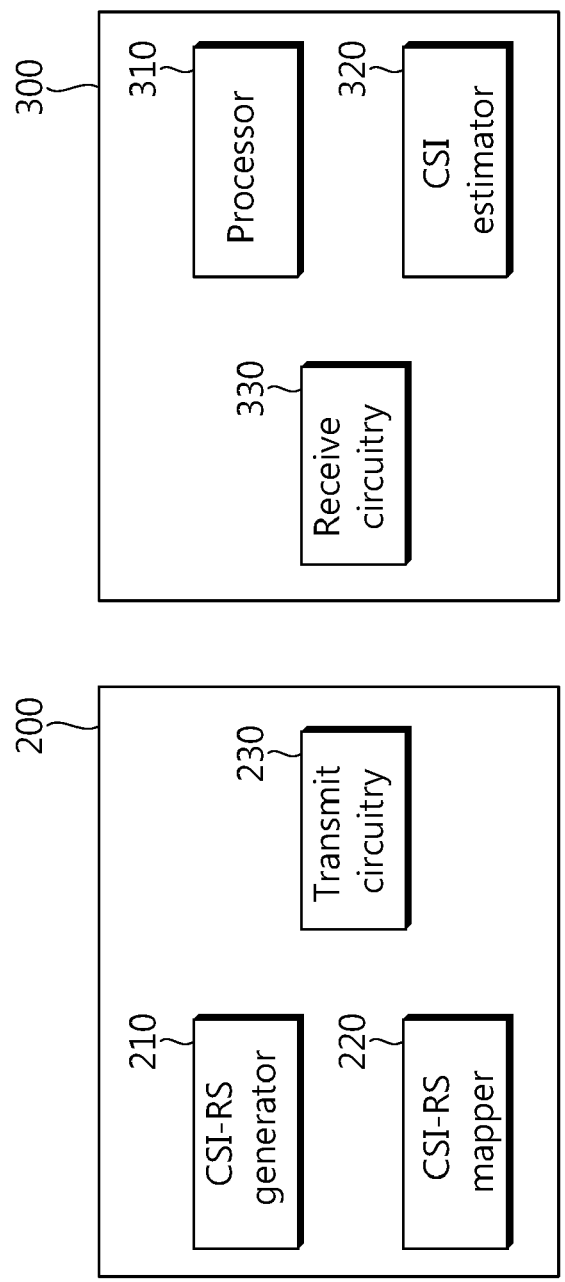
FIG. 22 is a block diagram of a transmitter and a receiver in which the embodiments of the present invention are implemented.

FIG. 22 is a block diagram of a transmitter and a receiver in which the embodiments of the present invention are implemented.

The transmitter 200 includes a CSI-RS generator 210, a CSI-RS mapper 220, and a transmit circuitry 230. The CSI-RS generator 210 and the CSI-RS mapper 220 implement the proposed functions, processes, and/or methods. The CSI-RS generator 210 generates CSI-RSs for a plurality of respective antennas. The CSI-RS mapper 220 maps the CSI-RSs to a resource region on the basis of a CSI-RS pattern according to the number of antennas. The transmit circuitry 230 transmits or receives or both a radio signal including the CSI-RSs.

The receiver 300 includes a processor 310, a CSI estimator 320, and a receive circuitry 330. The receive circuitry 330 transmits or receives or both a radio signal including CSI-RSs. The CSI estimator 320 estimates a channel state using the received CSI-RSs. The processor 320 processes the radio signal based on the estimated channel state.

The present invention can be implemented using hardware, software, or a combination of them. In the hardware implementations, the present invention can be implemented using an Application Specific Integrated Circuit (ASIC), a Digital Signal Processor (DSP), a Programmable Logic Device (PLD), a Field Programmable Gate Array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A transmitter for transmitting reference signals in a wireless communication system, the transmitter comprising:
a Channel State Information (CSI) reference signal (CSI-RS) generator configured to generate CSI-RSs for each of a plurality of antennas;
a CSI-RS mapper configured to map the CSI-RSs to a resource region based on a CSI-RS pattern corresponding to a number of the plurality of antennas, the number of the plurality of antennas being eight,
wherein the eight transmit antennas include two legacy antennas that can be used for Cell-specific Reference Signals (CRSs) and six additional antennas that can be used for the CSI-RSs with low density,
wherein the CSI-RSs with low density for the six additional antennas are transmitted every subframe irrespective of a number of layers used for the CSI-RSs transmission,
wherein the resource region is assigned to a subframe having two slots,
wherein, if the two legacy antennas are used for the CRSs and the six additional antennas are used for the CSI-RSs and if the subframe has a normal Cyclic Prefix (CP), each slot of the subframe comprises 7 Orthogonal Frequency Division Multiplexing (OFDM) symbols and the CSI-RSs mapped at the resource region are at both an eleventh OFDM symbol and a last OFDM symbol of the subframe,
wherein the eleventh OFDM symbol is calculated by an equation of $(2N_{symbol}-3)^{th}$, where the $N_{symbol}$ for the normal CP is seven,
wherein, if the two legacy antennas are used for the CRSs and the six additional antennas are used for the CSI-RSs and if the subframe has an extended CP, each slot of the subframe comprises 6 OFDM symbols and the CSI-RSs mapped at the resource region are at both a ninth OFDM symbol and a last OFDM symbol of the subframe, and
wherein the ninth OFDM symbol is calculated by the equation of $(2N_{symbol}-3)^{th}$, where the $N_{symbol}$ for the extended CP is six; and transmit circuitry configured to transmit a radio signal and the CSI-RSs, wherein the CSI-RS generator further generates additional CSI-RSs for tracking a time-varying channel for at least one of the antennas, wherein the additional CSI-RSs are configured by a signaling from a higher layer, and wherein the additional CSI-RSs are transmitted in both a subframe in which the CSI-RSs for said additional antennas are transmitted and a subframe in which the CSI-RSs for said additional antennas are not transmitted.

2. The transmitter of claim 1, wherein the resource region is assigned to the subframe at a fixed cycle.

3. The transmitter of claim 1, wherein the CSI-RSs for the respective antennas are mapped to the resource region at a regular interval of subcarriers.

4. The transmitter of claim 3, wherein the regular interval of the subcarriers is one of 3 subcarriers, 6 subcarriers, 7 subcarriers, 8 subcarriers, 9 subcarriers, and 12 subcarriers.

5. A receiver for processing reference signals a reference signal in a wireless communication system, the receiver comprising:

receive circuitry configured to receive a radio signal and Channel State Information (CSI) reference signals (CSI-RS);

a CSI estimator configured to estimate a channel state based on the CSI-RSs; and a processor operatively connected to the receive circuitry and the CSI estimator, the processor configured to process the radio signal using the estimated channel state, wherein the CSI-RSs are mapped to a resource region based on a CSI-RS pattern corresponding to a number of the plurality of antennas, the number of the plurality of antennas being eight, wherein the eight transmit antennas include two legacy antennas that can be used for Cell-specific Reference Signals (CRSs) and six additional antennas that can be used for the CSI-RSs with low density, wherein the CSI-RSs with low density for the six additional antennas are transmitted every subframe irrespective of a number of layers used for the CSI-RSs transmission, wherein the resource region is assigned to a subframe having two slots, wherein, if the two legacy antennas are used for the CRSs and the six additional antennas are used for the CSI-RSs and if the subframe has a normal Cyclic Prefix (CP), each slot of the subframe comprises 7 Orthogonal Frequency Division Multiplexing (OFDM) symbols and the CSI-RSs mapped at the resource region are at both an eleventh OFDM symbol and a last OFDM symbol of the subframe, wherein the eleventh OFDM symbol is calculated by an equation of $(2N_{symbol}-3)^{th}$, where the $N_{symbol}$ for the normal CP is seven, wherein, if the two legacy antennas are used for the CRSs and the six additional antennas are used for the CSI-RSs and if the subframe has an extended CP, each slot of the subframe comprises 6 OFDM symbols and the CSI-RSs mapped at the resource region are at both a ninth OFDM symbol and a last OFDM symbol of the subframe, wherein the ninth OFDM symbol is calculated by the equation of $(2N_{symbol}-3)^{th}$, where the $N_{symbol}$ for the extended CP is six, wherein additional CSI-RSs are generated for tracking a time-varying channel for at least one of the antennas, wherein the additional CSI-RSs are configured by a signaling from a higher layer, and wherein the additional CSI-RSs are transmitted in both a subframe in which the CSI-RSs for said additional antennas are transmitted and a subframe in which the CSI-RSs for said additional antennas are not transmitted.

6. A method of transmitting reference signals in a wireless communication system, the method comprising:

generating Channel State Information (CSI) reference signals (CSI-RS) for each of a plurality of antennas;

mapping the CSI-RSs to a resource region based on a CSI-RS pattern corresponding to a number of the plurality of antennas, the number of the plurality of antennas being eight, wherein the eight transmit antennas include two legacy antennas that can be used for Cell-specific Reference Signals (CRSs) and six additional antennas that can be used for the CSI-RSs with low density, wherein the CSI-RSs with low density for the six additional antennas are transmitted every subframe irrespective of a number of layers used for the CSI-RSs transmission, wherein the resource region is assigned to a subframe having two slots, wherein, if the two legacy antennas are used for the CRSs and the six additional antennas are used for the CSI-RSs and if the subframe has a normal Cyclic Prefix (CP), each slot of the subframe comprises 7 Orthogonal Frequency Division Multiplexing (OFDM) symbols and the CSI-RSs mapped at the resource region are at both an eleventh OFDM symbol and a last OFDM symbol of the subframe, wherein the eleventh OFDM symbol is calculated by an equation of $(2N_{symbol}-3)^{th}$, where the $N_{symbol}$ for the normal CP is seven, wherein, if the two legacy antennas are used for the CRSs and the six additional antennas are used for the CSI-RSs and if the subframe has an extended CP, each slot of the subframe comprises 6 OFDM symbols and the CSI-RSs mapped at the resource region are at both a ninth OFDM symbol and a last OFDM symbol of the subframe, wherein the ninth OFDM symbol is calculated by the equation of $(2N_{symbol}-3)^{th}$, where the $N_{symbol}$ for the extended CP is six; and transmitting the CSI-RSs, wherein additional CSI-RSs are further generated for tracking a time-varying channel for at least one of the antennas, wherein the additional CSI-RSs are configured by a signaling from a higher layer, and wherein the additional CSI-RSs are transmitted in both a subframe in which the CSI-RSs for said additional antennas are transmitted and a subframe in which the CSI-RSs for said additional antennas are not transmitted.

* * * * *